(12) United States Patent
Sheppard et al.

(10) Patent No.: US 12,120,391 B2
(45) Date of Patent: Oct. 15, 2024

(54) METHODS AND APPARATUS TO ESTIMATE AUDIENCE SIZES AND DURATIONS OF MEDIA ACCESSES

(71) Applicant: The Nielsen Company (US), LLC, New York, NY (US)

(72) Inventors: Michael Richard Sheppard, Holland, MI (US); Dongbo Cui, New York, NY (US); Jake Ryan Dailey, San Francisco, CA (US); Edward Murphy, North Stonington, CT (US); Diane Morovati Lopez, West Hills, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/475,873

(22) Filed: Sep. 15, 2021

(65) Prior Publication Data
US 2022/0095014 A1   Mar. 24, 2022

Related U.S. Application Data

(60) Provisional application No. 63/080,511, filed on Sep. 18, 2020.

(51) Int. Cl.
*H04N 21/442* (2011.01)
*H04N 21/45* (2011.01)
*H04N 21/466* (2011.01)

(52) U.S. Cl.
CPC ... *H04N 21/4532* (2013.01); *H04N 21/44204* (2013.01); *H04N 21/44224* (2020.08); *H04N 21/4661* (2013.01); *H04N 21/4667* (2013.01)

(58) Field of Classification Search
CPC ......... H04N 21/4532; H04N 21/44224; H04N 21/442004; H04N 21/4661; H04N 21/4667
See application file for complete search history.

(56) References Cited

U.S. PATENT DOCUMENTS

| 610,637 A | 9/1898 | Powell |
| 3,070,139 A | 12/1962 | Witschi et al. |

(Continued)

FOREIGN PATENT DOCUMENTS

| JP | 2015529870 | 10/2015 |
| JP | 2015529970 A | 10/2015 |

(Continued)

OTHER PUBLICATIONS

Huckett et al., "Combining Methods to Create Synthetic Microdata: Quantile Regression, Hot Deck, and Rank Swapping," Research Gate, Apr. 2008, 11 pages.

(Continued)

*Primary Examiner* — Jefferey F Harold
*Assistant Examiner* — Charles N Hicks

(57) ABSTRACT

Methods and apparatus to estimate audience sizes and durations for media accesses are disclosed. An example apparatus at least one memory, instructions, and processor circuitry to execute the instructions to select constraint equations corresponding to one or more events, the one or more events corresponding to a first audience and a second audience, the first audience to include the second audience, and determine, based on the constraint equations and an auxiliary equation, event audience sizes corresponding to the first audience and to the one or more events.

18 Claims, 10 Drawing Sheets

(56) References Cited

U.S. PATENT DOCUMENTS

| | | |
|---|---|---|
| 5,956,692 A | 9/1999 | Foley |
| 6,029,045 A | 2/2000 | Picco et al. |
| 6,108,637 A | 8/2000 | Blumenau |
| 6,460,025 B1 | 10/2002 | Fohn et al. |
| 6,775,663 B1 | 8/2004 | Kim |
| 7,043,433 B2 | 5/2006 | Hejna, Jr. |
| 7,197,472 B2 | 3/2007 | Conkwright et al. |
| 7,746,272 B2 | 6/2010 | Vollath |
| 7,865,916 B2 | 1/2011 | Beser et al. |
| 7,954,120 B2 | 5/2011 | Roberts et al. |
| 8,087,041 B2 | 12/2011 | Fu et al. |
| 8,112,301 B2 | 2/2012 | Harvey et al. |
| 8,149,162 B1 | 4/2012 | Pauls |
| 8,169,892 B2 | 5/2012 | Malkamaki et al. |
| 8,171,032 B2 | 5/2012 | Herz |
| 8,185,456 B2 | 5/2012 | Leclair et al. |
| 8,200,693 B2 | 6/2012 | Steele et al. |
| 8,214,518 B1 | 7/2012 | Bertz |
| 8,370,489 B2 | 2/2013 | Mazumdar et al. |
| 8,423,406 B2 | 4/2013 | Briggs |
| 8,453,173 B1 | 5/2013 | Anderson et al. |
| 8,572,019 B2 | 10/2013 | Hejna, Jr. |
| 8,619,652 B2 | 12/2013 | Singh et al. |
| 8,619,892 B2 | 12/2013 | Vetter et al. |
| 8,660,895 B1 | 2/2014 | Saurabh et al. |
| 8,874,652 B1 | 10/2014 | Pecjak et al. |
| 8,904,149 B2 | 12/2014 | Eren et al. |
| 8,913,023 B2 | 12/2014 | Li et al. |
| 8,930,701 B2 | 1/2015 | Burbank et al. |
| 8,973,023 B1 | 3/2015 | Rao et al. |
| 8,973,123 B2 | 3/2015 | Bjones et al. |
| 9,070,139 B2 | 6/2015 | Zhang |
| 9,094,710 B2 | 7/2015 | Lee et al. |
| 9,111,186 B2 | 8/2015 | Blasinski et al. |
| 9,224,094 B2 | 12/2015 | Oliver et al. |
| 9,236,962 B2 | 1/2016 | Hawkins et al. |
| 9,237,138 B2 | 1/2016 | Bosworth et al. |
| 9,420,320 B2 | 8/2016 | Doe |
| 9,467,745 B1 | 10/2016 | Hotchkiss et al. |
| 9,529,836 B1 | 12/2016 | Hale |
| 9,870,486 B2 | 1/2018 | Sullivan et al. |
| 9,979,614 B2 | 5/2018 | Kalus et al. |
| 10,045,057 B2 | 8/2018 | Shah et al. |
| 10,070,166 B2 | 9/2018 | Chaar et al. |
| 10,115,434 B2 | 10/2018 | Leppanen et al. |
| 10,237,419 B2 | 3/2019 | Shah et al. |
| 10,270,673 B1 | 4/2019 | Sheppard et al. |
| 10,309,451 B2 | 6/2019 | Yoshino et al. |
| 10,313,752 B2 | 6/2019 | Nagaraja Rao et al. |
| 10,380,633 B2 | 8/2019 | Morovati et al. |
| 10,382,318 B2 | 8/2019 | Hong et al. |
| 10,382,818 B2 | 8/2019 | Sheppard et al. |
| 10,425,458 B2 | 9/2019 | Salgueiro et al. |
| 10,491,696 B2 | 11/2019 | Gierada |
| 10,536,358 B2 | 1/2020 | Sheppard et al. |
| 10,602,224 B2 | 3/2020 | Sullivan et al. |
| 10,609,451 B2 | 3/2020 | de Andrade et al. |
| 10,681,414 B2 | 6/2020 | Sheppard et al. |
| 10,728,614 B2 | 7/2020 | Sheppard et al. |
| 10,743,064 B2 | 8/2020 | Berezowski et al. |
| 10,803,475 B2 | 10/2020 | Rao et al. |
| 10,856,027 B2 | 12/2020 | Sheppard et al. |
| 10,958,956 B2 | 3/2021 | Ricci |
| 11,039,190 B1 | 6/2021 | Dailey et al. |
| 11,115,710 B2 | 9/2021 | Sheppard et al. |
| 11,140,449 B2 | 10/2021 | Sullivan et al. |
| 11,216,834 B2 | 1/2022 | Sheppard et al. |
| 11,308,514 B2 | 4/2022 | Sheppard et al. |
| 11,323,772 B2 | 5/2022 | Sheppard et al. |
| 11,425,458 B2 | 8/2022 | Sheppard et al. |
| 11,438,662 B2 | 9/2022 | Sullivan et al. |
| 11,481,802 B2 | 10/2022 | Sheppard et al. |
| 11,483,606 B2 | 10/2022 | Sheppard et al. |
| 11,523,177 B2 | 12/2022 | Sheppard et al. |
| 11,553,226 B2 | 1/2023 | Sheppard et al. |
| 11,689,767 B2 | 6/2023 | Sheppard et al. |
| 2002/0123928 A1 | 9/2002 | Eldering et al. |
| 2003/0037041 A1 | 2/2003 | Hertz |
| 2004/0001538 A1 | 1/2004 | Garrett |
| 2004/0059549 A1 | 3/2004 | Kropaczek et al. |
| 2005/0071218 A1 | 3/2005 | Lin et al. |
| 2006/0190318 A1 | 8/2006 | Downey et al. |
| 2007/0028006 A1 | 2/2007 | Laefer et al. |
| 2007/0033074 A1 | 2/2007 | Nitzan et al. |
| 2007/0087756 A1 | 4/2007 | Hoffberg |
| 2007/0282785 A1 | 12/2007 | Fayyad et al. |
| 2008/0004958 A1 | 1/2008 | Ralph et al. |
| 2008/0028006 A1 | 1/2008 | Liu et al. |
| 2008/0228543 A1 | 9/2008 | Doe |
| 2008/0300965 A1 | 12/2008 | Doe |
| 2008/0301746 A1 | 12/2008 | Wiser et al. |
| 2008/0313017 A1 | 12/2008 | Totten |
| 2009/0265215 A1 | 10/2009 | Lindstrom |
| 2010/0161385 A1 | 6/2010 | Karypis et al. |
| 2010/0185516 A1 | 7/2010 | Swanson et al. |
| 2010/0191723 A1 | 7/2010 | Perez et al. |
| 2010/0318413 A1 | 12/2010 | Zinkevich et al. |
| 2011/0015992 A1 | 1/2011 | Liffiton et al. |
| 2011/0196733 A1 | 8/2011 | Li et al. |
| 2012/0023522 A1 | 1/2012 | Anderson et al. |
| 2012/0025930 A1 | 2/2012 | Gilliland et al. |
| 2012/0052930 A1 | 3/2012 | McGucken |
| 2012/0066410 A1 | 3/2012 | Stefanakis et al. |
| 2012/0072940 A1 | 3/2012 | Fuhrer |
| 2012/0110027 A1 | 5/2012 | Falcon |
| 2012/0254911 A1 | 10/2012 | Doe |
| 2012/0254922 A1 | 10/2012 | Rangarajan et al. |
| 2013/0138743 A1 | 5/2013 | Amento et al. |
| 2013/0165277 A1 | 6/2013 | Wang |
| 2013/0198125 A1 | 8/2013 | Oliver et al. |
| 2013/0226655 A1 | 8/2013 | Shaw |
| 2013/0254787 A1 | 9/2013 | Cox et al. |
| 2013/0290233 A1 | 10/2013 | Ferren et al. |
| 2013/0339991 A1 | 12/2013 | Ricci |
| 2013/0346033 A1 | 12/2013 | Wang et al. |
| 2014/0101685 A1 | 4/2014 | Kitts et al. |
| 2014/0112557 A1 | 4/2014 | Santamaria-Pang et al. |
| 2014/0278933 A1 | 9/2014 | McMillan |
| 2014/0280891 A1 | 9/2014 | Doe |
| 2014/0337104 A1 | 11/2014 | Splaine et al. |
| 2014/0358676 A1 | 12/2014 | Srivastava et al. |
| 2015/0032310 A1 | 1/2015 | Zettel et al. |
| 2015/0095138 A1 | 4/2015 | Rao et al. |
| 2015/0179953 A1 | 6/2015 | Mujica-Fernaud et al. |
| 2015/0180989 A1 | 6/2015 | Seth |
| 2015/0184652 A1 | 7/2015 | Murakami |
| 2015/0186403 A1 | 7/2015 | Srivastava et al. |
| 2015/0189500 A1 | 7/2015 | Bosworth et al. |
| 2015/0193816 A1 | 7/2015 | Toupet et al. |
| 2015/0244820 A1 | 8/2015 | Verkasalo et al. |
| 2015/0262207 A1 | 9/2015 | Rao et al. |
| 2015/0324837 A1 | 11/2015 | Shimizu et al. |
| 2015/0332310 A1 | 11/2015 | Cui et al. |
| 2015/0332317 A1 | 11/2015 | Cui et al. |
| 2016/0012314 A1 | 1/2016 | Ramamurthy et al. |
| 2016/0086208 A1 | 3/2016 | Oliver et al. |
| 2016/0132940 A1 | 5/2016 | Frommann et al. |
| 2016/0134934 A1 | 5/2016 | Jared et al. |
| 2016/0162955 A1 | 6/2016 | O'Kelley et al. |
| 2016/0165277 A1 | 6/2016 | Kirillov et al. |
| 2016/0232563 A1 | 8/2016 | Perez et al. |
| 2016/0233563 A1 | 8/2016 | Oshima et al. |
| 2016/0249098 A1 | 8/2016 | Pecjak et al. |
| 2016/0269783 A1 | 9/2016 | Mowrer et al. |
| 2016/0323616 A1 | 11/2016 | Doe |
| 2016/0373820 A1 | 12/2016 | Meyer et al. |
| 2016/0379246 A1 | 12/2016 | Sheppard et al. |
| 2017/0004526 A1 | 1/2017 | Morovati et al. |
| 2017/0006342 A1 | 1/2017 | Nagaraja Rao et al. |
| 2017/0034594 A1 | 2/2017 | Francis et al. |
| 2017/0053306 A1 | 2/2017 | Sissenich et al. |
| 2017/0061470 A1 | 3/2017 | Sheppard et al. |
| 2017/0155956 A1 | 6/2017 | Nagaraja Rao et al. |
| 2017/0171580 A1 | 6/2017 | Hirsch et al. |

(56) References Cited

U.S. PATENT DOCUMENTS

| | | |
|---|---|---|
| 2017/0187478 A1 | 6/2017 | Shah et al. |
| 2017/0213243 A1 | 7/2017 | Dollard |
| 2017/0251253 A1 | 8/2017 | Sheppard et al. |
| 2017/0300911 A1 | 10/2017 | Alnajem |
| 2018/0073933 A1 | 3/2018 | Keskin et al. |
| 2018/0167675 A1 | 6/2018 | Doe |
| 2018/0189950 A1 | 7/2018 | Norouzi et al. |
| 2018/0198543 A1 | 7/2018 | Perrin et al. |
| 2018/0225709 A1 | 8/2018 | Ferber et al. |
| 2018/0240042 A1 | 8/2018 | Boada et al. |
| 2018/0249208 A1 | 8/2018 | Sheppard et al. |
| 2018/0249210 A1 | 8/2018 | Sheppard et al. |
| 2018/0249211 A1 | 8/2018 | Sheppard et al. |
| 2018/0249214 A1 | 8/2018 | Sullivan et al. |
| 2018/0315060 A1 | 11/2018 | Sheppard et al. |
| 2018/0332177 A1 | 11/2018 | Shah et al. |
| 2018/0367198 A1 | 12/2018 | Jian |
| 2018/0376198 A1 | 12/2018 | Sheppard et al. |
| 2019/0057403 A1 | 2/2019 | Sheppard et al. |
| 2019/0147461 A1 | 5/2019 | Sheppard et al. |
| 2019/0245760 A1 | 8/2019 | Sheppard et al. |
| 2019/0289363 A1 | 9/2019 | Nagaraja Rao et al. |
| 2019/0304205 A1 | 10/2019 | Sheppard et al. |
| 2019/0354574 A1 | 11/2019 | Wick et al. |
| 2019/0356950 A1 | 11/2019 | Sheppard et al. |
| 2019/0370860 A1 | 12/2019 | Morovati Lopez et al. |
| 2020/0007919 A1 | 1/2020 | Sheppard et al. |
| 2020/0014564 A1 | 1/2020 | Li et al. |
| 2020/0120387 A1 | 4/2020 | Sheppard et al. |
| 2020/0145720 A1* | 5/2020 | Krauss ................. H04N 21/812 |
| 2020/0175546 A1 | 6/2020 | Perez et al. |
| 2020/0204863 A1 | 6/2020 | Sullivan et al. |
| 2020/0228427 A1 | 7/2020 | Sheppard et al. |
| 2020/0294069 A1 | 9/2020 | Sheppard et al. |
| 2020/0296441 A1 | 9/2020 | Sheppard et al. |
| 2020/0359090 A1 | 11/2020 | Sheppard et al. |
| 2021/0014564 A1 | 1/2021 | Sheppard et al. |
| 2021/0058659 A1 | 2/2021 | Sheppard et al. |
| 2021/0065230 A1 | 3/2021 | Flynn |
| 2021/0065231 A1 | 3/2021 | Sheppard et al. |
| 2021/0084370 A1* | 3/2021 | Doe ................. H04N 21/47202 |
| 2021/0133773 A1 | 5/2021 | Sheppard et al. |
| 2021/0158376 A1 | 5/2021 | Sheppard et al. |
| 2021/0158377 A1 | 5/2021 | Sheppard et al. |
| 2021/0158391 A1 | 5/2021 | Sheppard et al. |
| 2021/0203563 A1 | 7/2021 | George et al. |
| 2021/0248629 A1 | 8/2021 | Sullivan et al. |
| 2021/0303552 A1 | 9/2021 | Pandey et al. |
| 2021/0319002 A1 | 10/2021 | Ryan et al. |
| 2021/0319474 A1 | 10/2021 | Sheppard et al. |
| 2021/0400341 A1 | 12/2021 | Sheppard et al. |
| 2021/0406343 A1 | 12/2021 | Sabra et al. |
| 2022/0036390 A1 | 2/2022 | Sheppard et al. |
| 2022/0038781 A1 | 2/2022 | Sullivan et al. |
| 2022/0058662 A1 | 2/2022 | Sheppard et al. |
| 2022/0058664 A1 | 2/2022 | Sheppard et al. |
| 2022/0058667 A1 | 2/2022 | Sheppard et al. |
| 2022/0058688 A1 | 2/2022 | Sheppard et al. |
| 2022/0122104 A1 | 4/2022 | Sheppard et al. |
| 2022/0159326 A1 | 5/2022 | Sheppard et al. |
| 2022/0253895 A1 | 8/2022 | Sheppard et al. |
| 2022/0264179 A1 | 8/2022 | Sheppard et al. |
| 2022/0264187 A1 | 8/2022 | Sheppard et al. |
| 2022/0408154 A1 | 12/2022 | Sheppard et al. |
| 2023/0042879 A1 | 2/2023 | Sheppard et al. |
| 2023/0070980 A1 | 3/2023 | Sullivan et al. |
| 2023/0105467 A1 | 4/2023 | Sheppard et al. |
| 2023/0111617 A1 | 4/2023 | Sheppard et al. |

FOREIGN PATENT DOCUMENTS

| | | |
|---|---|---|
| KR | 20160087263 A | 7/2016 |
| KR | 101934841 B1 | 1/2019 |
| WO | 0189216 A1 | 11/2001 |
| WO | 2007007693 A1 | 1/2007 |
| WO | 2008127737 A1 | 10/2008 |
| WO | 2014210597 | 12/2014 |
| WO | 2017054051 A1 | 4/2017 |
| WO | 2020190650 | 9/2020 |

OTHER PUBLICATIONS

Golub et al., "Linear Least Squares and Quadratic Programming," Technical Report No. CS 134, Stanford University, Computer Science Department, May 1969, 38 pages.

Charles L. Byrne, "Iterative Algorithms in Inverse Problems," Apr. 25, 2006, 347 pages.

Charles L. Byrne, "Applied Iterative Methods," Jan. 23, 2007, 396 pages.

Bourguignon et al., "On the Construction of Synthetic Panels," Oct. 2015, 42 pages.

Marno Verbeek, "Pseudo-Panels and Repeated Cross-Sections," The Econometrics of Panel Data, Springer-Verlag Berlin Heidelberg 2008, 15 pages.

P.J.G. Teunissen, "Least-Squares Estimation of the Integer GPS Ambiguities," Delft University of Technology, Department of the Geodetic Engineering, Aug. 1993, 16 pages.

Haggin, Patience et al., "Google Nears a Long-Tipped Limit on Tracking 'Cookies,' in Blow to Rivals," The Wall Street Journal, May 6, 2019, obtained from https://www.wsj.com/articles/googles-new-privacy-tools-to-make-cookies-crumble-competitors-stumble-11557151913, 3 pages.

Araujo et al., "Characterizing Videos, Audience and Advertising in Youtube Channels for Kids," arXiv:1707.00971v1 [cs. CY], Jul. 4, 2017, 11 pages.

Buzzard, "The Definition of the Audience in the History of Television Audience Research," University Microfilms International, 1985, 483 pages.

Shannon, C. E., "A Mathematical Theory of Communication," The Bell System Technical Journal, vol. 27, No. 3, pp. 379-423, 623-656, July, Oct. 1948, 55 pages.

"Entropy (information theory)," Wikipedia, Page last edited Dec. 23, 2019, Accessed Jan. 2, 2020, Retrieved rom the Internet: <URL: https://en.wikipedia.org/wiki/Entropy_{information_theory)>, 18 pages.

Koehler et al., "A Method for Measuring Online Audiences," 2013, Google, Inc., 24 pages.

Kapur, J.N., and Kesavan, H.K., "Entropy Optimization Principles with Applications," Academic Press, San Diego ' :-A, 1992, pp. 52-55, 76-97, 307-329, 346-351, 388-395, and 401-405, 37 pages.

United States Patent and Trademark Office, Non-Final Office Action, issued in connection with U.S. Appl. No. 16/698,180, mailed on Jun. 22, 2023, 13 pages.

"Kullback—Leibler Divergence", Wikipedia, Page last edited Dec. 13, 2019, Accessed Jan. 2, 2020, Retrieved from the Internet: <https://en.wikipedia.org/wiki/Kullback%E2%80%93Leibler_divergence> 15 pages.

"Maximum Entropy Probability Distribution", Wikipedia, Page last edited Nov. 11, 2019, Accessed Jan. 2, 2020, Retrieved from the Internet: <URL: https://en.wikipedia.org/wiki/Maximum_entropy_probability_distribution#Discrete_distributions_with_specitied_mean> 10 pages.

"Principle of Maximum Entropy", Wikipedia, Page last edited Nov. 8, 2019, Accessed Jan. 2, 2020, Retrieved from the Internet: <URL: https://en.wikipedia.org/wiki/Principle_of_maximum_entropy> 11 pages.

"A Mathematical Theory of Communication," Wikipedia, Page last edited Sep. 27, 2019, Accessed Jan. 2, 2020, Retrieved from the Internet: BURL: https://en.wikipedia.org/wiki/A_Mathematical_Theory_of Communication>, 2 pages.

Coffey, Steve, "Internet Audience Measurement: A Practitioner's View," Journal of Interactive Advertising, vol. 1 'No. 2 (Spring 2001), 8 pages.

Dai, Wenyuan, et al., "Transferring Naive Bayes Classifiers for Text Classification," Department of Computer Science and Engineering, Shanghai Jiao Tong University, Shanghai, China, Proceedings of the 22nd National conference on Artificial Intelligence, vol. 1, Jul. 22, 2007, 6 pages.

(56) References Cited

OTHER PUBLICATIONS

Esch et al., "Appendix 8 Numerical Methods for Solving Nonlinear Equations," Asset and Risk Management: Risk Oriented Finance, published 2005 by John Wiley & Sons Ltd., 7 pages.
Extended European Search Report received in European Application No. 20894507.1, mailed on Oct. 10, 2023, 8 pages.
Extended European Search Report received in European Application No. 20894628.5, mailed on Oct. 12, 2023, 8 pages.
International Preliminary Report on Patentability, issued in connection with International Application No. PCT/US2020/062079, mailed on May 17, 2022, 5 pages.
Seaver, Nick "Computing Taste," University of Chicago Press, 2022, 220 pages.
International Searching Authority, "International Search Report and Written Opinion," issued in connection with International Patent Application No. PCT/US2020/062072, mailed on Mar. 19, 2021, 9 pages.
International Searching Authority, "International Preliminary Report on Patentability", issued in connection with International Application No. PCT/US2020/062072, issued on May 17, 2022, 4 pages.
International Searching Authority, "International Search Report and Written Opinion," issued in connection with International Application No. PCT/US2020/062079, mailed on Mar. 24, 2021, 7 pages.
Jaynes, E. T., "Information Theory and Statistical Mechanics," The Physical Review, vol. 106, No. 4, pp. 620-630, May 15, 1957, 11 pages.
Jaynes, E.T., "Probability Theory: The Logic of Science," Cambridge University Press, (2003), Retrieved from the Internet: <URL: http://www.med.mcgill.ca/epidemiology/hanley/bios601/GaussianModel/JaynesProbabilityTheory.pdf> 758 pages.
Kapur, J.N., and Kesavan, H.K., "Entropy Optimization Principles and Their Applications," in: Singh V.P., Fiorentino M (eds) Entropy and Energy Dissipation in Water Resources, Water Science and Technology Library, vol. 9., pp. 3-20, Springer, Dordrecht, (1992), 18 pages.
United States Patent and Trademark Office, Non-Final Office Action, issued in connection with U.S. Appl. No. 16/698,180, mailed on Jun. 24, 2022, 15 pages.
Kitts et al., "A Comparison of Algorithms for TV Ad Targeting," 2014 IEEE International Conference on Data Mining Workshop, pp. 296-305, Dec. 1, 2014, 3 pages.
United States Patent and Trademark Office, Non-Final Office Action, issued in connection with U.S. Appl. No. 17/526,450, dated Oct. 30, 2023, 55 pages.
Kullback, S., and Leibler, R.A., "On Information and Sufficiency," The Annals of Mathematical Statistics, vol. 22, No. 1, pp. 79-86, 1951, 8 pages.
Lee et al., The Effect of Social Media Marketing Content on Consumer Engagement: Evidence from Facebook, https://mackinstitute.wharton.upenn.edu/wp-content/uploads/2015/01/FP0170Hosanagar-Kartik.pdf, Research Papers 3087, Stanford University, Graduate School of Business. (Year: 2014).
Samantha Braverman, Are the Online Marketing Efforts of TV Shows and Programs Worthwhile? Mar. 30, 2011, 9 pages.
Sanchez et al., ZSim: Fast and Accurate Microarchitectural Simulation of Thousand-Core Systems, ACM SIGARCH Computer Architecture News, Jun. 2013, 12 pages.
United States Patent and Trademark Office, Non-Final Office Action, issued in connection with U.S. Appl. No. 17/948,873, dated Nov. 16, 2023, 7 pages.
Trzcinski, Tomasz, "Analyse, Target & Advertise Privacy in mobile ads," Laboratory for Computer communications and Applications, EPFL, Lausanne, Switzerland, Jan. 17, 2011, 8 pages.
United States Patent and Trademark Office, "Advisory Action," issued in connection with U.S. Appl. No. 16/698,147, mailed on Feb. 8, 2023, 6 pages.
United States Patent and Trademark Office, "Final Office Action", issued in connection with U.S. Appl. No. 16/698,147, mailed Oct. 27, 2021, 20 pages.
United States Patent and Trademark Office, "Final Office Action", issued in connection with U.S. Appl. No. 16/698,147, mailed Sep. 9, 2022, 22 pages.
United States Patent and Trademark Office, "Final Office Action," issued in connection with U.S. Appl. No. 16/698,147, mailed on Sep. 27, 2023, 14 pages.
United States Patent and Trademark Office, "Non-Final Office Action", issued in connection with U.S. Appl. No. 16/698,147, mailed Feb. 23, 2022, 21 pages.
United States Patent and Trademark Office, "Non-Final Office Action," issued in connection with U.S. Appl. No. 16/698,147, mailed on Mar. 4, 2021, 20 pages.
United States Patent and Trademark Office, "Non-Final Rejection," issued in connection with U.S. Appl. No. 16/698,147, mailed on Mar. 20, 2023, 13 pages.
United States Patent and Trademark Office, "Non-Final Rejection," issued in connection with U.S. Appl. No. 17/406,886, mailed on Nov. 29, 2023, 22 pages.
United States Patent and Trademark Office, Final Office Action, issued in connection with U.S. Appl. No. 17/408,164, dated Dec. 8, 2023, 17 pages.
United States Patent and Trademark Office, Final Office Action, issued in connection with U.S. Appl. No. 16/698,180, mailed on Dec. 30, 2022, 12 pages.
United States Patent and Trademark Office, Final Office Action, issued in connection with U.S. Appl. No. 16/698,180, mailed on Mar. 1, 2022, 23 pages.
United States Patent and Trademark Office, Non-Final Office Action, issued in connection with U.S. Appl. No. 17/408,164, dated Mar. 29, 2023, 14 pages.
United States Patent and Trademark Office, Non-Final Office Action, issued in connection with U.S. Appl. No.16/698,180, mailed on Aug. 18, 2021, 19 pages.
United States Patent and Trademark Office, "Non-Final Rejection," issued in connection with U. S. U.S. Appl. No. 17/219,548, dated Dec. 22, 2022, 19 pages.
United States Patent and Trademark Office, "Final Rejection," issued in connection with U. S. U.S. Appl. No. 17/219,548, dated Dec. 11, 2023, 17 pages.
United States Patent and Trademark Office, "Non-Final Rejection," issued in connection with U.S. Appl. No. 16/698,147, dated Apr. 25, 2024, 16 pages.

\* cited by examiner

|  | PANEL 402 ↘ | 404 ↘ | CENSUS | 406 ↘ |
|---|---|---|---|---|
| WEBSITE (j) | AUDIENCE | DURATION | AUDIENCE | DURATION |
| 408 ▸ 1 | 100 | 300 | $X_1$ | 600 |
| 410 ▸ 2 | 200 | 400 | $X_2$ | 700 |
| TOTAL | 250 | | 450 | |

|  | PANEL 402 ↘ | 404 ↘ | 452 ↘ CENSUS | 406 ↘ |
|---|---|---|---|---|
| WEBSITE (j) | AUDIENCE | DURATION | AUDIENCE | DURATION |
| 408 ▸ 1 | 100 | 300 | 138 | 600 |
| 410 ▸ 2 | 200 | 400 | 333 | 700 |
| TOTAL | 250 | | 450 | |

412 ↗   414 ↗

METHODS AND APPARATUS TO ESTIMATE AUDIENCE SIZES AND DURATIONS OF MEDIA ACCESSES

RELATED APPLICATION

Priority is claimed to U.S. Provisional Patent Application No. 63/080,511, which was filed on Sep. 18, 2020. U.S. Provisional Patent Application No. 63/080,511 is hereby incorporated herein by reference in its entirety.

FIELD OF THE DISCLOSURE

This disclosure relates generally to computer-based audience measurement and, more particularly, to methods and apparatus to estimate audience sizes and durations for media accesses.

BRIEF DESCRIPTION OF THE DRAWINGS

FIG. 4A is a first example table showing example panel audience sizes, example panel event durations, and example census event durations.

FIG. 4B is a second example table showing the example panel audience sizes, the panel event durations, and the census event durations of FIG. 4A and example census audience sizes determined in accordance with teachings of this disclosure.

Figure 1:
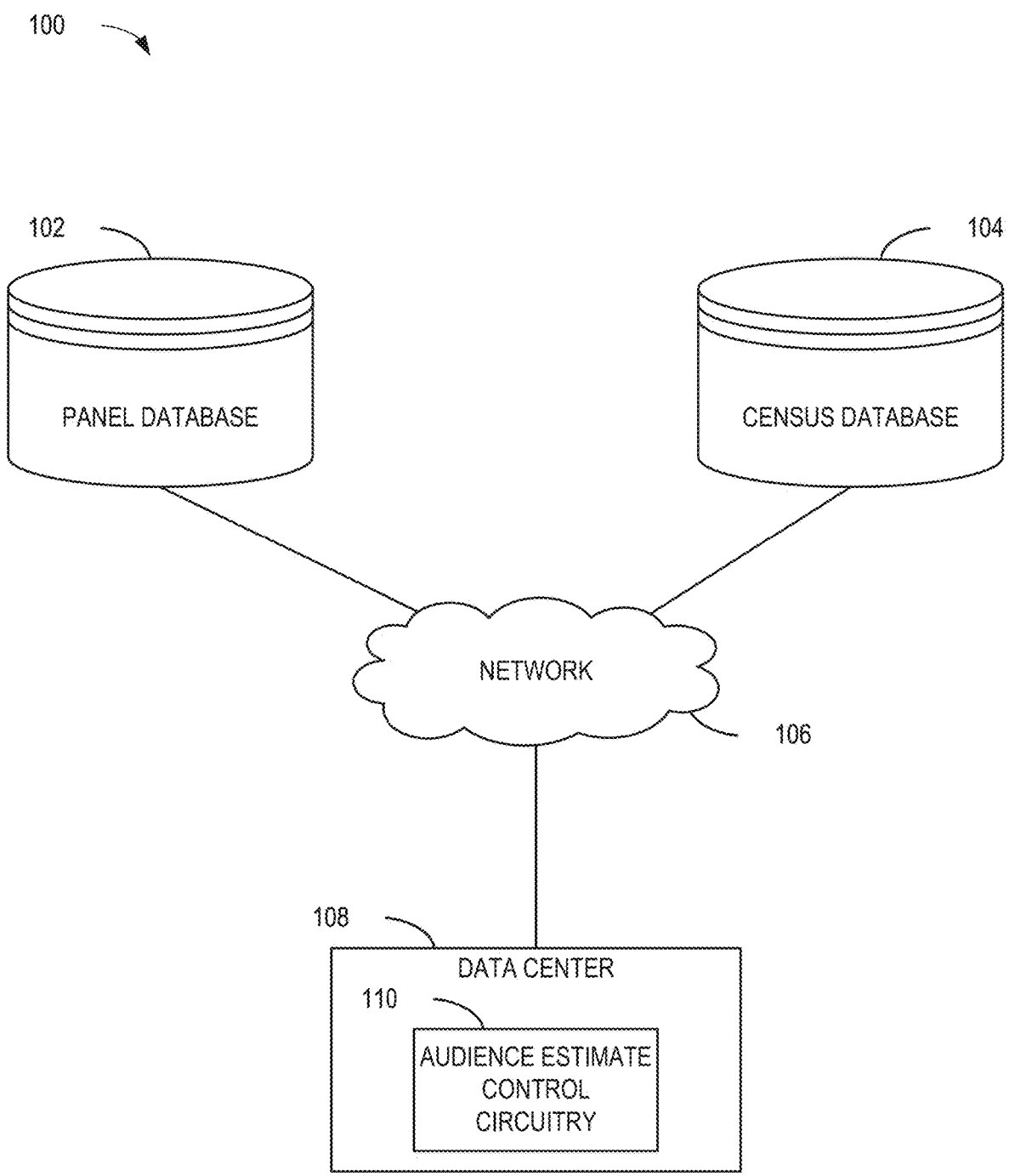
FIG. 1 illustrates example audience estimate control circuitry for estimating census audience size in accordance with teachings of this disclosure.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Techniques for monitoring user access to an Internet-accessible media, such as digital television (DTV) media, digital advertisement ratings (DAR), and digital content ratings (DCR) media, have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client requests the media, both the media and the monitoring instructions are downloaded to the client. The monitoring instructions are, thus, executed whenever the media is accessed, be it from a server or from a cache. Upon execution, the monitoring instructions cause the client to send or transmit monitoring information from the client to a media provider site. The monitoring information is indicative of the manner in which media was displayed.

In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, impression requests or ping requests cause monitoring data reflecting information about an access to the media to be sent from the client device that downloaded the media to a monitoring entity and can provide a cookie to identify the client device and/or a user of the client device. In some examples, the monitoring entity is an audience measurement entity (AME) that did not provide the media to the client and who is a trusted (e.g., neutral) third party for providing accurate usage statistics (e.g., The Nielsen Company, LLC). Since the AME is a third party relative to the entity serving the media to the client device, the cookie sent to the AME in the impression request to report the occurrence of the media impression at the client device is a third-party cookie. Third-party cookie tracking is used by measurement entities to track access to media accessed by client devices from first-party media servers.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, My Space, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietors to recognize their subscribers when they visit their web sites.

The protocols of the Internet make cookies inaccessible outside of the domain (e.g., Internet domain, domain name, etc.) on which they were set. Thus, a cookie set in, for example, the facebook.com domain (e.g., a first party) is accessible to servers in the facebook.com domain, but not to servers outside that domain. Therefore, although an AME (e.g., a third party) might find it advantageous to access the cookies set by the database proprietors, they are unable to do so.

The inventions disclosed in Mazumdar et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mazumdar accomplish this task by structuring the AME to respond to impression requests from clients (who may not be a member of an audience measurement panel and, thus, may be unknown to the AME) by redirecting the clients from the AME to a database proprietor, such as a social network site partnered with the AME, using an impression response. Such a redirection initiates a communication session between the client accessing the tagged media and the database proprietor. For example, the impression response received at the client device from the AME may cause the client device to send a second impression request to the database proprietor. In response to the database proprietor receiving this impression request from the client device, the database proprietor (e.g., Facebook) can access any cookie it has set on the client to thereby identify the client based on the internal records of the database proprietor. In the event the client device corresponds to a subscriber of the database proprietor, the database proprietor logs/records a database proprietor demographic impression in association with the user/client device.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population or audience members (e.g., the number of times the media is accessed). In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

In examples disclosed herein, the term duration corresponds to an aggregate or total of the individual exposure times associated with impressions during a monitoring interval. For example, the aggregation or total can be at the individual level such that a duration is associated with an individual, the aggregation or total can be at the demographic level such that the duration is associated with a given demographic, the aggregation or total can be at the population level such that the duration is associated with a given population universe, etc. In examples disclosed herein, the duration of audience exposure for an individual may be logged over a measurement interval, but the actual number of impressions themselves may be unknown, given that an individual can watch, for example, between 20 to 30 minutes of different videos during a measurement interval, but the total impressions (e.g., number of individual videos watched) during the measurement interval is unknown.

A user of a computing device (e.g., a mobile device, a tablet, a laptop, etc.) and/or a television may be exposed to the same media via multiple devices (e.g., two or more of a mobile device, a tablet, a laptop, etc.) and/or via multiple media types (e.g., digital media available online, digital TV (DTV) media temporality available online after broadcast, TV media, etc.). For example, a user may start watching the Walking Dead television program on a television as part of TV media, pause the program, and continue to watch the program on a tablet as part of DTV media. In such an example, the exposure to the program may be logged by an AME twice, once for an impression log associated with the television exposure, and once for the impression request generated by a tag (e.g., a census measurement science (CMS) tag) executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists) for which an audience measurement entity stores demographic information or unknown users (e.g., non-panelists or census audience) for which the audience measurement entity may be able to estimate and/or obtain demographic information. Deduplication is a process to adjust cross-platform media exposure totals by substantially reducing or eliminating the double counting of individual audience members that were exposed to media via more than one platform and/or are represented in more than one database of media impressions used to determine the reach of the media.

As used herein, a unique audience is based on audience members distinguishable from one another. That is, a particular audience member exposed to particular media is measured as a single unique audience member regardless of how many times that audience member is exposed to that particular media or the particular platform(s) through which the audience member is exposed to the media. If that particular audience member is exposed multiple times to the same media, the multiple exposures for the particular audience member to the same media is counted as only a single unique audience member. As used herein, an audience size is a quantity of unique audience members of particular events. As used herein, an event represents an access or exposure to a media item for some duration. That is, while an impression (e.g., a media impression) represents an instance or a count of an access or exposure to a media item by an audience member, an event represents an access or exposure to a media item by an audience member and a duration for which that audience member accessed or was exposed to that media. In some examples, an event can include an audience member using a device type and a duration for which that audience member used that device type. An audience size is a number of deduplicated or unique audience members that accessed or were exposed to a media item of interest of audience metrics analysis. A deduplicated or unique audience member is one that is counted only once as part of an audience size. Thus, regardless of whether a particular person is detected as accessing a media item once or multiple times, that person is only counted once as the audience size for that media item. In this manner, impression performance for particular media is not disproportionately represented when a small subset of one or more audience members is exposed to or access the same media an excessively large number of times while a larger number of audience members is exposed to or access that same media fewer times or not at all. Audience size may also be referred to as unique audience or deduplicated audience. By tracking media exposures or accesses by unique audience members, a unique audience measure may be used to determine a reach measure to identify how many unique audience members are reached by media. In some examples, increasing unique audience and, thus, reach, is useful for advertisers wishing to reach a larger audience base.

Notably, although third-party cookies are useful for third-party measurement entities in many of the above-described techniques to track media accesses and to leverage demographic information from third-party database proprietors, use of third-party cookies may be limited or may cease in some or all online markets. That is, use of third-party cookies enables sharing anonymous subscriber information (without revealing personally identifiable information (PII)) across entities which can be used to identify and deduplicate audience members across database proprietor impression data. However, to reduce or eliminate the possibility of revealing user identities outside database proprietors by such anonymous data sharing across entities, some websites, internet domains, and/or web browsers will stop (or have already stopped) supporting third-party cookies. This will make it more challenging for third-party measurement entities to track media accesses via first-party servers. That is, although first-party cookies will still be supported and useful for media providers to track accesses to media via their own first-party servers, neutral third parties interested in generating neutral, unbiased audience metrics data will not have access to the impression data collected by the first-party servers using first-party cookies. Examples disclosed herein may be implemented with or without the availability of third-party cookies because, as mentioned above, the datasets used in the deduplication process are generated and provided by database proprietors, which may employ first-party cookies to track media impressions from which the datasets are generated.

FIG. 1 illustrates an example audience estimation system 100 for estimating census audience size in accordance with teachings of this disclosure. The example audience estimation system 100 includes an example panel database 102, an example census database 104, an example network 106, and an example data center 108. The example data center 108 includes example audience estimate control circuitry 110 to estimate audience sizes and/or durations for media accesses in accordance with teachings of this disclosure. The example data center 108 may be owned and/or operated by an AME, a database proprietor, a media provider, etc.

As used herein, a media impression is defined as an occurrence of an access and/or an exposure to media (e.g., an advertisement, a movie, a movie trailer, a song, a web page banner, a webpage, etc.). Examples disclosed herein may be used to monitor for media impressions of any one or more media types (e.g., video, audio, a webpage, an image, text, etc.). In examples disclosed herein, media may be content and/or advertisements. Examples disclosed herein are not restricted for use with any particular type of media. On the contrary, examples disclosed herein may be implemented in connection with tracking impressions for media of any type or form.

In the illustrated example of FIG. 1, the panel database 102 stores panelist data obtained by an AME using panel meters located at panelist households or other panelist metering sites. For example, the panelist data can include monitoring data representative of media to which a panelist was exposed. A panelist is a person that has enrolled in an audience panel of an entity such as an AME, a database proprietor, and/or any other entity. The person enrolls in the panel by providing PII (e.g., name, demographics, address, etc.) and agreeing to have their media access activities monitored. The example panel database 102 stores panel data including panel audience sizes and/or panel event durations. As used herein, a panel audience size represents a quantity of unique panelist audience members that accessed and/or were exposed to a media item, and a panel event duration is a total duration of the exposure or access to that media item by the unique panelist audience members. In some examples, the panel database 102 stores panel data for particular events. For example, the panel database 102 stores a panel event duration and a panel audience size for a first website, a panel event duration and a panel audience size for a second website, etc.

The example census database 104 of the illustrated example of FIG. 1 stores census data obtained by an AME. For example, the census database 104 can include impression-related data collected from devices not identifiable as belonging to panelists. As such, these impressions are referred to as census impressions collected as anonymous impressions for which a collecting entity (e.g., an AME, a database proprietor, etc.) does not have demographic information. In some examples, the data stored in the census database 104 includes data from a relatively larger sample size compared to the panel data stored in the panel database 102. In examples disclosed herein, the census database 104 stores census event durations. As used herein, a census event duration is a total duration of exposures or accesses to a media item by corresponding census audience members. In some examples, the census database 104 stores census event durations for different events. For example, the census database 104 stores a census event duration for a first website, a census event duration for a second website, etc.

The example network 106 of the illustrated example of FIG. 1 is a wide area network (WAN) such as the Internet. However, in some examples, local networks may additionally or alternatively be used. Moreover, the example network 106 may be implemented using any type of public or private network, such as, but not limited to, the Internet, a telephone network, a local area network (LAN), a cable network, and/or a wireless network, or any combination thereof.

In the illustrated example of FIG. 1, the data center 108 communicates with the panel database 102 and the census database 104 through the network 106. In some examples, the data center 108 contains the audience estimate control circuitry 110. In the illustrated example of FIG. 1, the data center 108 is an execution environment used to implement the audience estimate control circuitry 110. In some examples, the data center 108 is associated with a media monitoring entity (e.g., an AME, etc.). In some examples, the data center 108 can be a physical processing center (e.g., a central facility of the media monitoring entity, etc.). Additionally or alternatively, the data center 108 can be implemented via a cloud service (e.g., Amazon® Web Services (AWS), Microsoft® Azure Web Services, etc.). In this example, the data center 108 can further store and process panel data and census data.

The example audience estimate control circuitry 110 of the illustrated example of FIG. 1 estimates census audience sizes of events. In some examples, the audience estimate control circuitry 110 accesses and obtains panel data (e.g., panel event durations, panel audience sizes) from the panel database 102 and/or census data (e.g., census event durations) from the census database 104. The example audience estimate control circuitry 110 determines a deduplicated census audience size (e.g., a census unique audience size) based on the panel data and the census data. The example audience estimate control circuitry 110 is described below in connection with FIG. 2. In some examples, the audience estimate control circuitry 110 is an application-specific integrated circuit (ASIC), and in some examples the audience estimate control circuitry 110 is a field programmable gate array (FPGA). Alternatively, the example audience estimate control circuitry 110 can be software located in the firmware of the data center 108.

Figure 2:
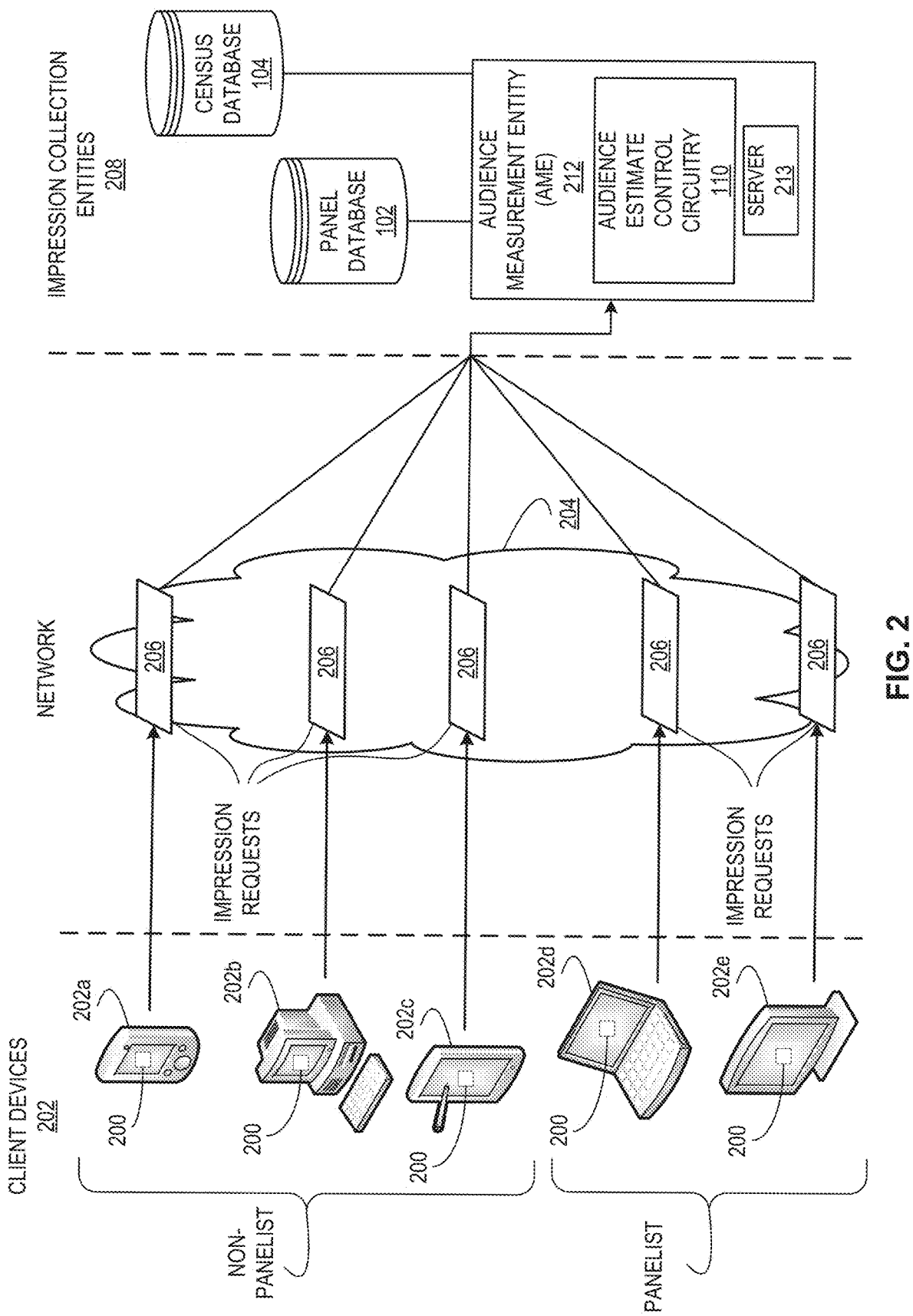
FIG. 2 illustrates example client devices that report audience impression requests for Internet-based media to impression collection entities to facilitate estimating sizes of audiences exposed to different Internet-based media.

FIG. 2 illustrates example network-based impression logging techniques. Such example techniques may be used to collect the panel impression information (e.g., panel impression records) in the panel database 102 and the census impression information (e.g., panel impression records) in the census database 104. FIG. 2 illustrates example client devices 202 that report audience impression requests for Internet-based media 200 to impression collection entities 208 to identify a unique audience and/or a frequency distribution for the Internet-based media. The illustrated example of FIG. 2 includes the example client devices 202, an example network 204, example impression requests 206, and the example impression collection entities 208. As used herein, an impression collection entity 208 refers to any entity that collects impression data (e.g., logs impression records) such as, for example, an example AME 212. Although only the AME 212 is shown, other impression collection entities may also collect impression data. In the illustrated example, the AME 212 logs panel impressions in impression records in the panel database 102 and logs census impressions in impression records in the census database 104. In other examples, one or more other impression collection entities in addition to or instead of the AME 212 may log impressions and/or durations for one or both of the panel database 102 and the census database 104. In some examples, a server 213 of the AME 212 logs census impressions in the census database 104 and another server of a database proprietor (separate from the AME 212) logs panel impressions in the panel database 102 based on its subscribers. In such examples, subscribers of the database proprietor operate the panelist client devices 202d and 202e such that the database proprietor recognizes the panelist client devices 202d, 202e as operated by its subscribers based on information (e.g., first-party cookies) in the impression requests 206 from the panelist client devices 202d, 202e. In the illustrated example, the AME 212 includes the example audience estimate control circuitry 110 of FIG. 1.

The example client devices 202 of the illustrated example may be any device capable of accessing media over a network (e.g., the example network 204). For example, the client devices 202 may be an example mobile device 202a, an example computer 202b, 202d, an example tablet 202c, an example smart television 202e, and/or any other Internet-capable device or appliance. Examples disclosed herein may be used to collect impression information for any type of media including content and/or advertisements. Media may include advertising and/or content delivered via websites, streaming video, streaming audio, Internet protocol television (IPTV), movies, television, radio and/or any other vehicle for delivering media. In some examples, media includes user-generated media that is, for example, uploaded to media upload sites, such as YouTube, and subsequently downloaded and/or streamed by one or more other client devices for playback. Media may also include advertisements. Advertisements are typically distributed with content (e.g., programming, on-demand video and/or audio). Traditionally, content is provided at little or no cost to the audience because it is subsidized by advertisers that pay to have their advertisements distributed with the content. As used herein, "media" refers collectively and/or individually to content and/or advertisement(s).

The example network 204 is a communications network. The example network 204 allows transmission or delivery of the example impression requests 206 from the example client devices 202 to the example impression collection entities 208. The example network 204 may be a local area network, a wide area network, the Internet, a cloud, or any other type of communications network.

The impression requests 206 of the illustrated example include information about accesses to media at the corresponding client devices 202 generating the impression requests. Such impression requests 206 allow monitoring entities, such as the impression collection entities 208, to collect a number of and/or duration of media impressions for different media accessed via the client devices 202. By collecting media impressions, the impression collection entities 208 can generate media impression quantities for different media (e.g., different content and/or advertisement campaigns).

The impression collection entities 208 of the illustrated example include the example panel database 102, the example census database 104, and the example AME 212. In some examples, execution of the beacon instructions corresponding to the media 200 causes the client devices 202 to send impression requests 206 to the server 213 (e.g., accessible via an Internet protocol (IP) address or uniform resource locator (URL)) of the impression collection entities 208 in the impression requests 206. In some examples, the beacon instructions cause the client devices 202 to provide device and/or user identifiers and media identifiers in the impression requests 206. The device/user identifier may be any identifier used to associate demographic information with a user or users of the client devices 202. Example device/user identifiers include cookies, hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), an Ad ID (e.g., an advertising ID introduced by Apple, Inc. for uniquely identifying mobile devices for purposes of serving advertising to such mobile devices), third-party service identifiers (e.g., advertising service identifiers, device usage analytics service identifiers, demographics collection service identifiers), etc. In some examples, fewer or more device/user identifier(s) may be used. The media identifiers (e.g., embedded identifiers, embedded codes, embedded information, signatures, etc.) enable the impression collection entities 208 to identify media (e.g., the media 200) objects accessed via the client devices 202. The impression requests 206 of the illustrated example cause the AME 212 to log impressions for the media 200. In the illustrated example, an impression request is a reporting to the AME 212 of an occurrence of the media 200 being presented at the client device 202. The impression requests 206 may be implemented as a hypertext transfer protocol (HTTP) request. However, whereas a transmitted HTTP request identifies a webpage or other resource to be downloaded, the impression requests 206 include audience measurement information (e.g., media identifiers and device/user identifier) as its payload. The example server 213 to which the impression requests 206 are directed is programmed to log the audience measurement information of the impression requests 206 as an impression (e.g., a media impression such as advertisement and/or content impressions depending on the nature of the media accessed via the client device 202). In some examples, the server 213 of the AME 212 may transmit a response based on receiving an impression request 206. However, a response to the impression request 206 is not necessary. It is sufficient for the server 213 to receive the impression request 206 to log an impression based on the impression request 206. As such, in examples disclosed herein, the impression request 206 is a dummy HTTP request for the purpose of reporting an impression but to which a receiving server need not respond to the originating client device 202 of the impression request 206.

In the illustrated example, the example AME 212 does not provide the media 200 to the client devices 202 and is a trusted (e.g., neutral) third party (e.g., The Nielsen Company, LLC) for providing accurate media access (e.g., exposure) statistics. The example AME 212 includes the example audience estimate control circuitry 110. As further disclosed herein, the example audience estimate control circuitry 110 estimates census audience sizes of events related to the example impression requests 206. The example audience estimate control circuitry 110 is described in connection with FIGS. 1 and/or 3.

In operation, the example client devices 202 employ web browsers and/or applications (e.g., apps) to access media. Some of the web browsers, applications, and/or media include instructions that cause the example client devices 202 to report media monitoring information to one or more of the example impression collection entities 208. That is, when the client device 202 of the illustrated example accesses media, a web browser and/or application of the client device 202 executes instructions in the media, in the web browser, and/or in the application to send the example impression request 206 to one or more of the example impression collection entities 208 via the network (e.g., a local area network, wide area network, wireless network, cellular network, the Internet, and/or any other type of network). The example impression requests 206 of the illustrated example include information about accesses to the media 200 and/or any other media at the corresponding client devices 202 generating the impression requests 206. Such impression requests allow monitoring entities, such as the example impression collection entities 208, to collect media impressions for different media accessed via the example client devices 202. In this manner, the impression collection entities 208 can generate media impression quantities for different media (e.g., different content and/or advertisement campaigns).

The example AME 212 accesses panel data in the example panel database 102 and/or census data in the example census database 104. The panel data includes information related to a total number of the logged impressions and/or any other information related to the logged impressions (e.g., durations, demographics, a total number of registered users exposed to the media 200 more than once, etc.) that corresponds to registered panelists. The census data includes information related to logged impressions and/or any other impression-related information that corresponds to non-panelist audience members. The example audience estimate control circuitry 110 estimates census audience sizes of events based on impression requests 206 in accordance with teachings of this disclosure.

Figure 3:
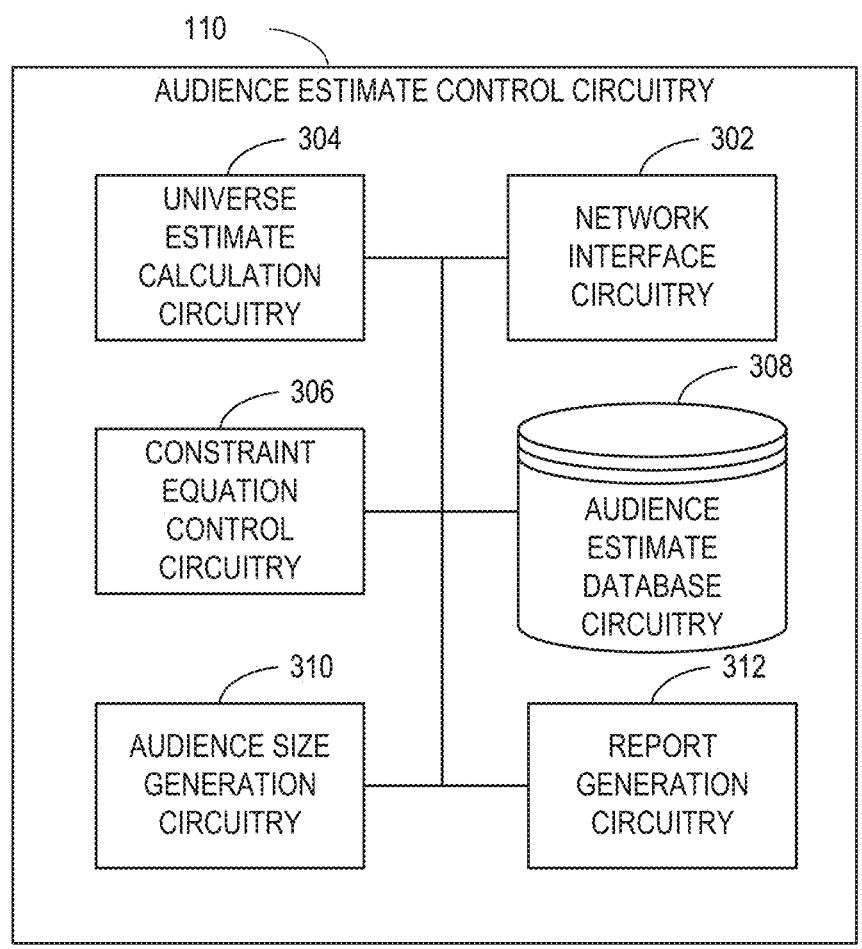
FIG. 3 is a block diagram of the example audience estimate control circuitry of FIG. 1.

FIG. 3 is a block diagram of the example audience estimate control circuitry 110 of FIGS. 1 and/or 2. The example audience estimate control circuitry 110 includes example network interface circuitry 302, example universe estimate calculation circuitry 304, example constraint equation control circuitry 306, example audience estimate database circuitry 308, example audience size generation circuitry 310, and example report generation circuitry 312.

The example network interface circuitry 302 of the illustrated example of FIG. 3 allows the audience estimate control circuitry 110 to receive and/or otherwise obtain panel data and/or census data from the example network 106 of FIG. 1. In some examples, the network interface circuitry 302 can be continuously connected to the network 106, the panel database 102, and/or the census database 104 for communication with the network 106, the panel database 102, and/or the census database 104. In other examples, the network interface circuitry 302 can be periodically or aperiodically connected for periodic or aperiodic communication with the network 106, the panel database 102, and/or the census database 104. In some examples, the network interface circuitry 302 can be absent.

In some examples, the audience estimate control circuitry 110 includes means for obtaining data. For example, the means for obtaining data may be implemented by the network interface circuitry 302. In some examples, the network interface circuitry 302 may be implemented by machine executable instructions such as that implemented by at least block 502 of FIG. 5 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the network interface circuitry 302 is implemented by other hardware logic circuitry, hardware implemented state machines, and/or any other combination of hardware, software, and/or firmware. For example, the network interface circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example universe estimate calculation circuitry 304 of the illustrated example of FIG. 3 determines pseudo-universe estimates for the panel data and/or for the census data. The example audience size generation circuitry 310 determines census audience sizes for events based on the pseudo-universe estimates.

In some examples, the audience estimate control circuitry 110 includes means for selecting an auxiliary equation. For example, the means for selecting the auxiliary equation may be implemented by the universe estimate calculation circuitry 304. In some examples, the universe estimate calculation circuitry 304 may be implemented by machine executable instructions such as that implemented by at least blocks 602, 610 of FIG. 6 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the universe estimate calculation circuitry 304 is implemented by other hardware logic circuitry, hardware implemented state machines, and/or any other combination of hardware, software, and/or firmware. For example, the universe estimate calculation circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

For examples in which only audience sizes of events are considered (e.g., durations of events are not considered), there are n+2 constraints, where n is the number of events. That is, there are n constraints from each respective event audience (e.g., $z_j$ $j=\{1, \ldots, n\}$), a constraint for total audience (e.g., $z_*$), and a constraint for total normalized audience to 100% (e.g., $z_0$). Each constraint has a Lagrange Multiplier, which can be expressed in multiplicative form in terms of the unknown variables as shown in example Equations 1a, 1b, and 1c.

$$z_0 z \cdot z_j \prod_{\substack{k=1 \\ k \neq j}}^{n} (1 - z_j) = A_j \quad j = \{1, 2, \ldots, n\} \quad \text{(Equation 1a)}$$

$$z_0 z \cdot \left( \prod_{k=1}^{n} (1 + z_j) - 1 \right) = A. \quad \text{(Equation 1b)}$$

$$z_0 + z_0 z \cdot \left( \prod_{k=1}^{n} (1 + z_j) - 1 \right) = 1 \quad \text{(Equation 1c)}$$

The variable $A_j$ is the proportion of people in the marginal audience of the $j^{th}$ event such that the sum is normalized to 100% relative to the universe estimate, U. The variable $A_*$ is the proportion of the total unique audience size such that the sum is normalized to 100% with respect to the universe estimate. For example, if U=200 (e.g., the universe estimate is 200 people) and $A_j$=0.3 (e.g., the proportion of people in the audience of the $j^{th}$ event is 30% of the universe estimate), then the audience size of the $j^{th}$ event is 60 people.

Solving example Equations 1a-c for $z_j$, $z_*$, and $z_0$ produces example Equations 2a, 2b, and 2c below.

$$z_j = \frac{A_j}{Q - A_j} \quad j = \{1, 2, \ldots, n\} \quad \text{(Equation 2a)}$$

$$z_* = \frac{Q - A_*}{1 - A_*} \quad \text{(Equation 2b)}$$

$$z_0 = 1 - A_* \quad \text{(Equation 2c)}$$

The variable Q is the pseudo-universe estimate. That is, the variable Q is what the universe estimate, U, would be to predict the panel data and census data assuming independence.

Thus, Q can be solved for using example Equation 3 below.

$$1 - \frac{A_*}{Q} = \prod_{j=1}^{n} \left(1 - \frac{A_j}{Q}\right) \quad \text{(Equation 3)}$$

In examples disclosed herein, durations of events are considered in addition to the audience sizes of the events. As described above, an individual that is a member of an event (e.g., viewed a television show, accessed a webpage, etc.) corresponds to at least some duration of that event. In examples disclosed herein, the audience size is normalized by the population (e.g., example Equation 1c). Thus, the durations are also normalized by the population. For example, the network interface circuitry 202 may receive data from the panel database 102 including a duration of 500 time units, a panel audience size of 20 people, and a total population of 50 people. In such an example, the audience constraint is 40% (e.g., 20/50=0.4) while the duration constraint is 10 (e.g., 500/50=10). In examples disclosed herein, the time units of the durations can be any suitable and/or arbitrary unit of time (e.g., seconds, minutes, hours, etc.) to be used to track/measure duration. However, examples disclosed herein are implemented so that durations scale appropriately in the same direction. For example, estimates of audience sizes should be invariant to changes in the time units, while the estimates of duration should scale with the changes in the time units.

In examples disclosed herein, the panel database 102 and the census database 104 include durations for each event. That is, the panel database 102 includes a panel event duration for each event and the census database 104 includes a census impression count for each event. Thus, if $z_j$ is the audience-only multiplier (e.g., audience size) and the set $\{z_j^{(a)}, z_j^{(d)}\}$ are multipliers for splitting the audience into different durations, an equality can be written as shown in example Equation 4 below.

$$z_j = z_j^{(a)} \left(\int_{t=0}^{\infty} (z_j^{(d)})^t dt\right) \quad \text{(Equation 4)}$$

$$= z_j^{(a)} \left(\frac{-1}{\log(z_j^{(d)})}\right)$$

As described above, the variable $z_j^{(a)}$ is the event audience constraint and the variable $z_j^{(d)}$ is the event duration constraint. That is, the left-hand side of example Equation 4 is the Lagrange Multiplier for the audience of $j^{th}$ event. The right-hand side of example Equation 4 represents a partition, integrating across all continuous durations that belong to the $j^{th}$ event. Thus, the information contained in the collection of the subsets of impressions is identical to only having access to audience-only information in this example.

The example Equation 2a (e.g., solving for $z_j$) can be substituted into example Equation 4, producing example Equation 5 below.

$$\frac{A_j}{Q - A_j} = z_j^{(a)} \left(\frac{-1}{\log(z_j^{(d)})}\right) \quad j = \{1, 2, \ldots, n\} \quad \text{(Equation 5)}$$

The unknown variable $z_j^{(d)}$ can be determined based on example Equation 6 below.

$$\frac{D_j}{A_j} = \frac{\int_{t=0}^{\infty} t(z_j^{(d)})^t dt}{\int_{t=0}^{\infty} (z_j^{(d)})^t dt} = \frac{-1}{\log(z_j^{(d)})} \quad j = \{1, 2, \ldots, n\} \quad \text{(Equation 6)}$$

Thus, $z_j^{(d)}$ can be defined as shown in example Equation 7 below.

$$z_j^{(d)} = \exp\left(\frac{D_j}{A_j}\right) \quad \text{(Equation 7)}$$

Further, $z_j^{(a)}$ can be determined by substituting a value of $z_j^{(d)}$ from example Equation 7 into example Equation 5 to produce example Equation 8 as shown below.

$$z_j^{(a)} = \frac{A_j^2}{(Q - A_j)D_j} \quad \text{(Equation 8)}$$

In summary, there are four equations of the model, shown in example Equations 9a, 9b, 9c, and 9d below.

$$z_0 z_* z_j \prod_{\substack{k=1 \\ k \neq j}}^{n} (1 + z_j) = A_j \quad j = \{1, 2, \ldots, n\} \quad \text{(Equation 9a)}$$

$$\left(\frac{-1}{\log(z_j^{(d)})}\right) z_0 z_* z_j \prod_{\substack{k=1 \\ k \neq j}}^{n} (1 + z_j) = D_j \quad \text{(Equation 9b)}$$

$$j = \{1, 2, \ldots, n\}$$

$$z_0 z_* \left(\prod_{k=1}^{n} (1 + z_j) - 1\right) = A_* \quad \text{(Equation 9c)}$$

-continued $$z_0 + z_0 z_\bullet \left( \prod_{k=1}^{n} (1 + z_j) - 1 \right) = 1 \quad \text{(Equation 9d)}$$

The four equations above (Equations 9a-9d) are solved using example Equation 10 below, where example Equation 10 is based on example Equation 4 above.

$$z_j = z_j^{(a)} \left( \frac{-1}{\log(z_j^{(d)})} \right) \quad \text{(Equation 10)}$$

Solving for the four constraints (e.g. $z_j^{(a)}$, $z_j^{(d)}$, $z_\bullet$, $z_0$) produces example Equations 11a, 11b, 11c, and 11d below.

$$z_j^{(a)} = \frac{A_j^2}{(Q - A_j) D_j} \quad j = \{1, 2, \ldots, n\} \quad \text{(Equation 11a)}$$

$$z_j^{(d)} = \exp\left(-\frac{A_j}{D_j}\right) \quad j = \{1, 2, \ldots, n\} \quad \text{(Equation 11b)}$$

$$z_\bullet = \frac{Q - A_\bullet}{1 - A_\bullet} \quad \text{(Equation 11c)}$$

$$z_0 = 1 - A_\bullet \quad \text{(Equation 11d)}$$

Example Equation 12 below can be used to determine Q.

$$1 - \frac{A_\bullet}{Q} = \prod_{j=1}^{n} \left(1 - \frac{A_j}{Q}\right) \quad \text{(Equation 12)}$$

That is, the example universe estimate calculation circuitry 304 can use example Equation 12 to determine the pseudo-universe estimate (e.g., Q). In some examples, the universe estimate calculation circuitry 304 can determine a panel pseudo-universe estimate (e.g., $Q_P$) corresponding to the panel data, and a census pseudo-universe estimate (e.g., $Q_C$) corresponding to the census data.

In examples disclosed herein, multipliers of the unknown constraints (e.g., the audience constraints, $z_j^{(a)}$) in the census data must equal the same multipliers for the panel data. This equality is illustrated in example Equation 13 below.

$$\{z_j^{(a)}\} P = \{z_j^{(a)}\} C \, j = \{1, 2, \ldots, n\} \quad \text{(Equation 13)}$$

That is, the set of unknowns, $z_j^{(a)}$, within the panel, P, must equal the same set of unknowns within the census, C. Thus, substituting example Equation 11a into example Equation 13 produces example Equation 14 below.

$$\frac{A_j^2}{(Q_P - A_j) D_j} = \frac{X_j^2}{(Q_C - X_j) V_j} \quad \text{(Equation 14)}$$

$$j = \{1, 2, \ldots, n\}$$

The variables {A, D} describe audience and durations of the panel, respectively, for different events j. The variables {X, V} describe audience and durations of the census, respectively, for different events j.

The subscripts of the variable Q represent the two different populations (e.g., universe estimates): panel, P, and census, C. Using example Equation 12, $Q_P$ can be solved as shown in example Equation 15 below.

$$1 - \frac{A_\bullet}{Q_P} = \prod_{i=1}^{n} \left(1 - \frac{A_i}{Q_P}\right) \quad \text{(Equation 15)}$$

That is, the example network interface circuitry 202 receives values for $A_\bullet$ (e.g., the total panel audience size) and $A_i$ (e.g., the panel audience sizes for the i events) from the panel database 102 (FIG. 1). Thus, the example universe estimate calculation circuitry 304 can determine the value of $Q_P$ using example Equation 15.

The example universe estimate calculation circuitry 304 can generate an auxiliary equation based on the census data. For example, the example network interface circuitry 202 receives values for $X_\bullet$ (e.g., the total census audience size), but does not receive values for $X_j$ (e.g., the census audience sizes for the j events) from the panel database 102. Using example Equation 12 and solving for $X_j$ produces a function of $X_j$ in terms of $Q_C$, illustrated in example Equation 16 below.

$$1 - \frac{X_\bullet}{Q_C} = \prod_{j=1}^{n} \left(1 - \frac{X_j}{Q_C}\right) \quad \text{(Equation 16)}$$

Example Equation 16 is the auxiliary equation, where $X_j$ and $Q_C$ are unknown variables. The example audience size generation circuitry 310 generates a system of equations including the auxiliary equation combined with constraint equations generated by the constraint equation control circuitry 306, where the system of equations can be solved to determine the unknown variables $X_j$ and $Q_C$.

In some examples, the audience estimate control circuitry 110 includes means for selecting constraint equations. For example, the means for selecting the constraint equations may be implemented by the constraint equation control circuitry 306. In some examples, the constraint equation control circuitry 306 may be implemented by machine executable instructions such as that implemented by at least block 504 of FIG. 5, block 604 of FIG. 6, and block 702 of FIG. 7. executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the constraint equation control circuitry 306 is implemented by other hardware logic circuitry, hardware implemented state machines, and/or any other combination of hardware, software, and/or firmware. For example, the constraint equation control circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example constraint equation control circuitry 306 of the illustrated example of FIG. 3 selects the constraint equations used to solve for census audiences sizes. For example, for each event in the panel data and/or the census data, the constraint equation control circuitry 306 selects a constraint equation corresponding to each event based on Equation 14 above. The example constraint equation control circuitry 306 can determine a value of the left-hand side of each constraint equation using known values of $Q_P$ and $A_.$. The example constraint equation control circuitry 306 can further determine a value of the right-hand side of the example Equation 14, resulting in example Equation 17 below.

$$\# = \frac{X_j^2}{(Q_C - X_j)V_j} \quad \text{(Equation 17)}$$

Wherein the symbol # is the numeric value of the right-hand side of example Equation 14. Thus, two unknown variables remain in example Equation 17 (e.g., the example network interface circuitry 202 receives values for census event durations $V_j$).

Although examples disclosed herein are described in connection with estimating census audience sizes for multiple events in which each event is a separate dimension, examples disclosed herein may also be used to estimate census audience size for a single dimension (e.g., a single event).

In examples of one dimension, example Equation 14 can be rewritten as shown in example Equation 18 below.

$$\frac{A^2}{(U-A)D} = \frac{X^2}{(U-X)V} \quad \text{(Equation 18)}$$

When there is only one dimension (e.g., j=1), there is a non-duplicated audience because there is no possibility of an individual being double counted in a single event. Thus, an actual universe estimate, U, is used instead of the pseudo-universe estimate, Q, which was used to account for possible double-counting for multiple dimension cases. When the dimension index, j, is removed as in example Equation 18 above, example Equation 18 can be rewritten as example Equation 19 below, which is a representation of example Equation 11a with Q defined as shown in example Equation 12.

$$z^{(a)} = \frac{A^2}{(U-A)(R-A)} \quad \text{(Equation 19)}$$

As $z^{(a)}$ is the multiplier for the audience constraint, and examples disclosed herein estimate the census audience, the equivalent expression in terms of census variables equals the same value. As such, example Equation 19 is equivalent to example Equation 18.

For single dimension cases in which example Equation 18 and/or example Equation 19 is/are used to solve for an unknown census audience estimate, only a single aggregate collection of group of people is considered, which could be, for example either a single demographic, the entire population, or some other collective group treated as a whole. In such examples, no partitioning into mutually exclusive groups (e.g., marginal audiences) is considered in this methodology.

In example Equations 18 and/or 19, the data represented is one-dimensional. Alternatively, if the impressions were across multiple websites, for example, any individual could visit any combination of websites for any duration creating a multiple dimensional array of possibilities to consider. The example single dimension methodology of example Equations 18 and/or 19 considers only the total durations across a collective group of entities, or a single entity by itself (e.g., a group of one). While these assumptions at first may seem a reductionist view of real-world scenarios, the example single dimension methodology gives a quick first order estimate of estimated census audience.

The example single dimension Equation 18 uses the following variable notation:

|  | Database Proprietor (Panel) | Census |
| --- | --- | --- |
| Audience | A | X |
| Durations | D | V |
| Universe Estimate | U | U |

Although the same variable U is used for both, they can be different (e.g., $U_1$ and $U_2$). In some examples, the data from the panel data is weighted to the population to correct any sampling bias. This would make the universe estimate the same for both and the weighted-audience estimate is corrected to account for known census values not considered in the panel data.

The example audience estimate database circuitry 308 of the illustrated example of FIG. 3 stores panel data and census data. For example, the audience estimate database circuitry 308 stores panel event durations, panel audience sizes, and/or census event durations received from the panel database 102 (FIG. 1) and the census database 104 (FIG. 1) via the network interface circuitry 202. The example audience estimate database circuitry 308 can also store the census audience sizes determined by the example audience size generation circuitry 310. However, other data may additionally and/or alternatively be stored by the audience estimate database circuitry 308. The example audience estimate database circuitry 308 of the illustrated example of FIG. 3 is implemented by any memory, storage device, and/or storage disc for storing data such as, for example, flash memory, magnetic media, optical media, solid state memory, hard drive(s), thumb drive(s), etc. Furthermore, the data stored in the example audience estimate database circuitry 308 may be in any format such as, for example, binary data, comma delimited data, tab delimitated data, structured query language (SQL) structures, etc. While, in the illustrated example of FIG. 3, the audience estimate database circuitry 308 is illustrated as a single device, the audience estimate database circuitry 308 and/or any other data storage devices described herein may be implemented by any number and/or type(s) of storage devices.

The example audience size generation circuitry 310 of the illustrated example of FIG. 3 determines census audience sizes corresponding to each event based on the system of equations selected by the universe estimate calculation circuitry 304 and/or the constraint equation control circuitry 306. For example, the system of equations may be selected to include one or more constraint equations corresponding to each event based on Equation 14, and an auxiliary equation based on Equation 15. The system of equations includes n+1 equations, where n is the number of events in the panel data and/or the census data. Furthermore, the system of equations includes n+1 unknown variables, including one or more variables $X_j$ corresponding to the census audience size for each event and a variable $Q_C$ corresponding to a census pseudo-universe estimate. As such, the example audience size generation circuitry 310 solves the system of equations to determine values for the unknown variables $X_j$ and $Q_C$.

In some examples, the audience estimate control circuitry 110 includes means for determining event audience sizes. For example, the means for determining event audience sizes may be implemented by the audience size generation circuitry 310. In some examples, the audience size generation circuitry 310 may be implemented by machine executable instructions such as that implemented by at least blocks 506, 508, and 510 of FIG. 5, blocks 606, 608, 612, and 614 of FIG. 6, and block 704 of FIG. 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the audience size generation circuitry 310 is implemented by other hardware logic circuitry, hardware implemented state machines, and/or any other combination of hardware, software, and/or firmware. For example, the audience size generation circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example report generation circuitry 312 of the illustrated example of FIG. 3 generates an output including data stored in the example audience estimate database circuitry 308. For example, the report generation circuitry 312 generates a report including census audience size for one or more events.

In some examples, the audience estimate control circuitry 110 includes means for generating a report. For example, the means for generating the report may be implemented by the report generation circuitry 312. In some examples, the report generation circuitry 312 may be implemented by machine executable instructions such as that implemented by at least block 512 of FIG. 5 and block 616 of FIG. 6 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the report generation circuitry 312 is implemented by other hardware logic circuitry, hardware implemented state machines, and/or any other combination of hardware, software, and/or firmware. For example, the report generation circuitry 312 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the audience estimate control circuitry 110 of FIGS. 1 and/or 2 is illustrated in FIG. 3, one or more of the elements, processes and/or devices illustrated in FIG. 3 may be combined, divided, re-arranged, omitted, eliminated and/or implemented in any other way. Further, the example network interface circuitry 302, the example universe estimate calculation circuitry 304, the example constraint equation control circuitry 306, the example audience estimate database circuitry 308, the example audience size generation circuitry 310, the example report generation circuitry 312 and/or, more generally, the example audience estimate control circuitry 110 of FIG. 3 may be implemented by hardware, software, firmware and/or any combination of hardware, software and/or firmware. Thus, for example, any of the example network interface circuitry 302, the example universe estimate calculation circuitry 304, the example constraint equation control circuitry 306, the example audience estimate database circuitry 308, the example audience size generation circuitry 310, the example report generation circuitry 312 and/or, more generally, the example audience estimate control circuitry 110 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example network interface circuitry 302, the example universe estimate calculation circuitry 304, the example constraint equation control circuitry 306, the example audience estimate database circuitry 308, the example audience size generation circuitry 310, and/or the example report generation circuitry 312 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience estimate control circuitry 110 of FIGS. 1 and/or 2 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIG. 4A is an example table 400 showing example panel audience sizes 402, example panel event durations 404, and example census event durations 406. In the illustrated example, the panel audience sizes 402 correspond to the variable $A_j$, the panel event durations 404 correspond to the variable $D_j$, and the census event durations 406 correspond to the variable $V_j$, where j represents respective events. For example, the network interface circuitry 202 can receive the panel audience sizes 402 and the panel event durations 404 from the panel database 102 (FIG. 1). Additionally or alternatively, the network interface circuitry 202 can receive the census event durations 406 from the example census database 104 (FIG. 1). The example table 400 includes an example first event 408 and an example second event 410. In the illustrated example of FIG. 4A, each of the events 408, 410 represents a visit to a corresponding website. For example, the first website 408 can be google.com and the second website 410 can be facebook.com.

As described above, an audience member of an event corresponds to at least some duration of that event. For example, the first website 408 has a panel audience size of 100, a panel event duration of 300, and a census event duration of 600. The example second website 410 has a panel audience size of 200, a panel event duration of 400, and a census event duration of 700.

The example table 400 includes an example total panel audience size 412 and an example total census audience size 414. The example total panel audience size 412 is not the sum of the panel audience sizes of the events 408, 410. For example, 100+200≠250. In the illustrated example of FIG. 4A, the events 408, 410 are not mutually exclusive. That is, there can be overlap between the audience members of each event 408, 410. For example, an audience member of the example first event 408 can also be an audience member of the example second event 410. That is, an audience member can visit multiple websites (e.g., the events 408, 410) any number of times and/or durations.

The example table 400 includes the example total census audience size 414. In the illustrated example of FIG. 4A, the total census audience size 414 is 450. However, the example table 400 does not include census audience size for each event 408, 410. The example audience size generation circuitry 310 (FIG. 3) determines census audience size estimates for each event 408, 410 based on the example panel audience sizes 402, the example panel event durations 404, and the example census event durations 406.

FIG. 4B is an example table 450 showing the panel audience sizes 402, the panel event durations 404, and the census event durations 406 of FIG. 4A, and example census audience sizes 452. That is, the example audience size generation circuitry 310 (FIG. 3) can use the panel data and the census data of the example table 400 (FIG. 4A) to determine an example first census audience size of the example first event 408 and an example second census audience size of the example second event 410. While an AME is interested in the example total census audience size 414 (e.g., 450), additional insights into the respective events (e.g., the events 408, 410) can be accomplished by knowing how the example total census audience size 414 is distributed across the events (e.g., the first census audience size and the second census audience size).

In the illustrated example of FIG. 4B, the example total panel audience size 412, A., is 250. The example panel audience sizes 402, $A_j$, are {100, 200}. Thus, the example universe estimate calculation circuitry 304 (FIG. 3) can use example Equation 15 to determine $Q_P$ is 400 (e.g., $$1 - \frac{250}{Q_P} = \prod_{i=1}^{n} \left(1 - \frac{A_i}{Q_P}\right) \text{ for } A_j = \{100, 200\}).$$

The example constraint equation control circuitry 306 (FIG. 3) can use the value of $Q_P$ in example Equation 14 to select constraint equations for the example first event 408 and the example second event 410, shown in example Equation 20 and example Equation 21 below, respectively.

$$\frac{1}{900} = \frac{X_1^2}{(Q_C - X_1)600} \qquad \text{(Equation 20)}$$

$$\frac{1}{400} = \frac{X_2^2}{(Q_C - X_2)700} \qquad \text{(Equation 21)}$$

That is, the census event duration, $V_1$, of the example first event 408 is 600 and the census event duration, $V_2$, of the example second event 410 is 700. In the illustrated example of FIG. 4B, example total census audience size 414, X., is 450. Thus, the example universe estimate calculation circuitry 304 can use example Equation 16 to determine an auxiliary equation including $Q_C$, where the auxiliary equation is shown in example Equation 22 below.

$$1 - \frac{450}{Q_C} = \prod_{j=1}^{n} \left(1 - \frac{X_j}{Q_C}\right) \qquad \text{(Equation 22)}$$

The example audience size generation circuitry 310 can then use example Equation 20 and example Equation 21 along with the auxiliary equation (e.g., Equation 22) to determine $Q_C$=2180.92 and the census audience sizes, $X_j$, are {138.435, 332.682}. That is, the example first census audience size is 139 and the example second census audience size is 333. In some examples, the audience size generation circuitry 310 stores the census audience sizes in the example audience estimate database circuitry 308 (FIG. 3). In the illustrated example of FIG. 4B, each census audience size is less than or equal to the example total census audience size 414.

Figure 5:
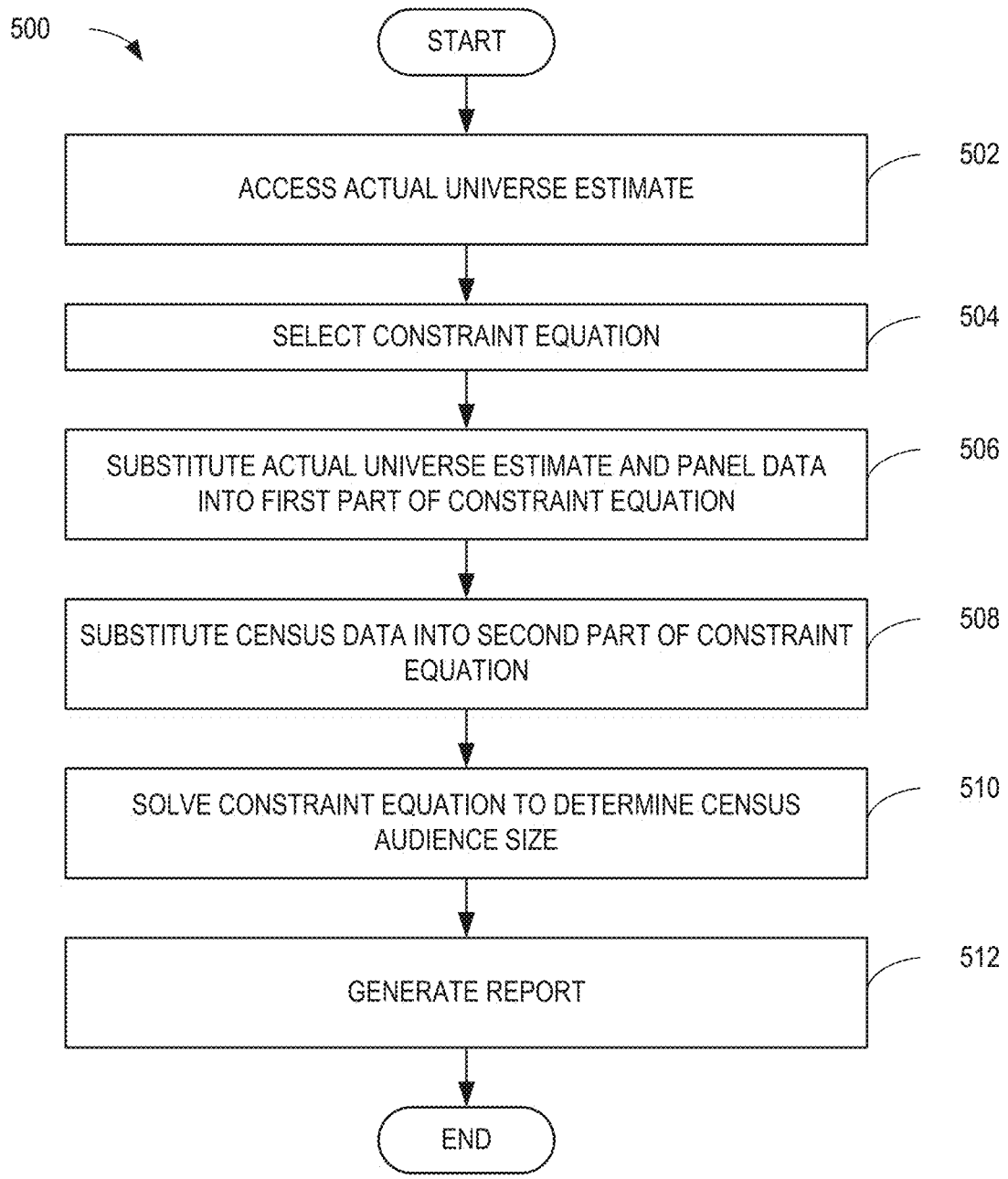
FIG. 5 is a flowchart representative of example machine readable instructions which may be executed to implement the example audience estimate control circuitry of FIGS. 1, 2, and/or 3 to estimate a census audience size for a single event.
Figure 6:
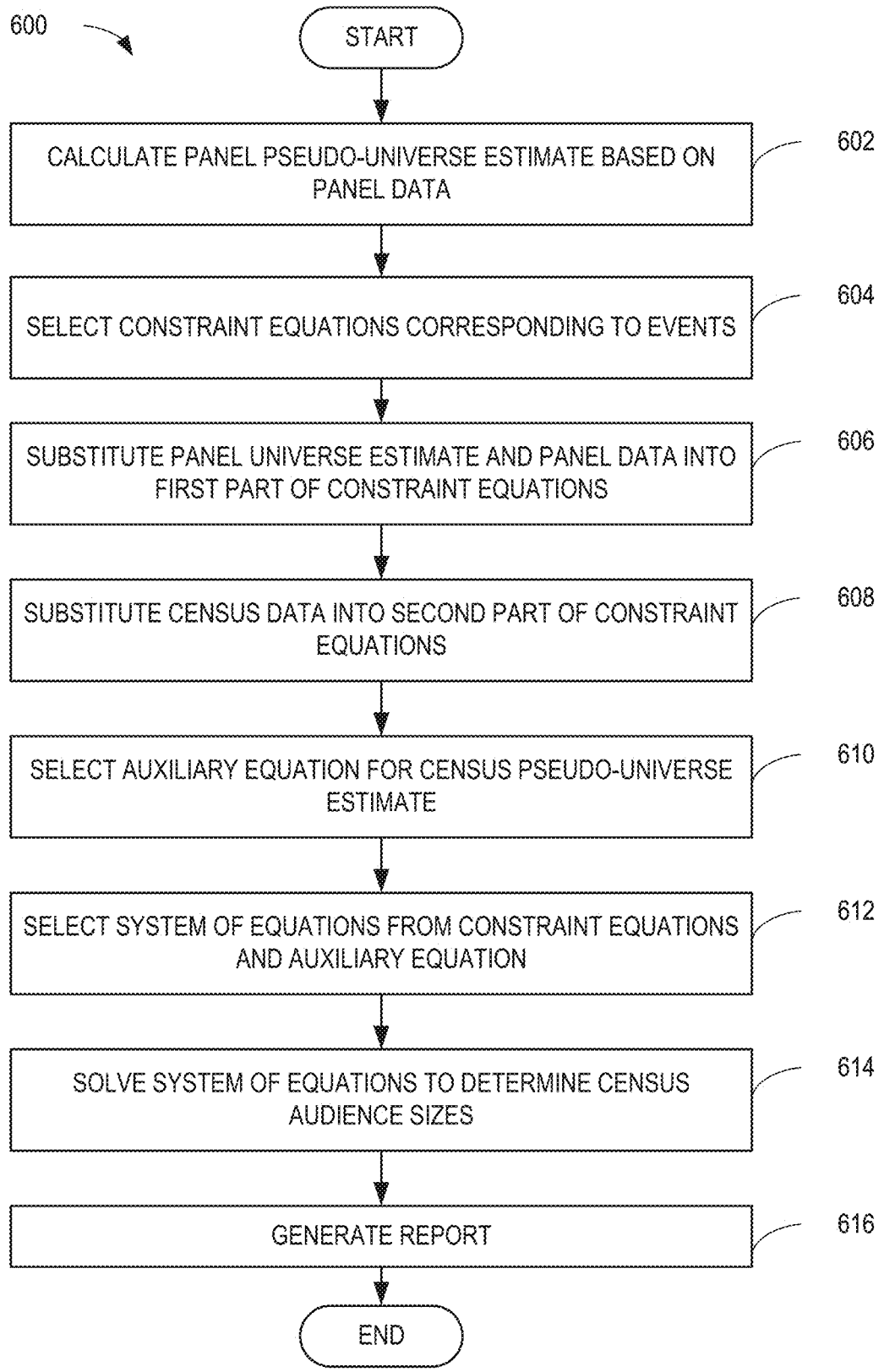
FIG. 6 is a flowchart representative of example machine readable instructions which may be executed to implement the example audience estimate control circuitry of FIGS. 1, 2, and/or 3 to estimate census audience sizes for multiple events.

Flowcharts representative of example hardware logic circuitry, machine readable instructions, hardware implemented state machines, and/or any combination thereof for implementing the audience estimate control circuitry 110 of FIG. 3 are shown in FIGS. 5, 6, and/or 7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 5, 6, and/or 7, many other methods of implementing the example audience estimate control circuitry 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5, 6, and/or 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions which may be executed to implement the example audience estimate control circuitry 110 of FIGS. 1, 2, and/or 3 to estimate a census audience size for a single event. In the illustrated example of FIG. 5, an example program 500 begins as the network interface circuitry 302 of FIG. 3 accesses panel data from the panel database 102 (FIG. 1) and accesses census data from the census database 104 (FIG. 1). For example, the network interface circuitry 202 may receive a panel event duration and a panel audience size from the panel database 102, and a census event duration from the census database 104. In some examples, the census event duration, the panel event duration, and/or the panel audience size correspond(s) to an event (e.g., visiting a website, watching media, etc.).

At block 502, the example audience estimate control circuitry 110 (FIG. 1) accesses an actual universe estimate U. For example, the network interface circuitry 302 accesses the actual universe estimate U from the panel database 102 and/or the census database 104.

At block 504, the example audience estimate control circuitry 110 selects a constraint equation. For example, the constraint equation control circuitry 306 (FIG. 3) selects Equation 18 above corresponding to a single event (e.g., visiting a website, watching media, etc.). In such examples, the panel audience size A, the panel event duration D, and the census event duration V are known, and the census audience size X is unknown. As used herein, known data is data that is directly obtained by the AME 212 from tracking of media impressions. As used herein, data is unknown when the data cannot be directly obtained via monitoring. In some examples, the unknown data can be estimated and/or inferred based on the known data.

At block 506, the example audience estimate control circuitry 110 substitutes the actual universe estimate U and the panel data into a first part of the constraint equation. For example, the audience size generation circuitry 310 (FIG. 3) obtains the panel audience size A and the panel event duration D from the panel data (e.g., from the panel database 102 of FIGS. 1 and 2), and obtains the actual universe estimate U via the network interface circuitry 302. In some examples, the actual universe estimate U is known from the census data. In such examples, the audience size generation circuitry 310 substitutes the panel audience size A, the panel event duration D, and the actual universe estimate U into the first part of the constraint equation (e.g., the left-hand side of Equation 18) and determines a value of the first part of the constraint equation.

At block 508, the example audience estimate control circuitry 110 substitutes the census data into a second part of the constraint equation. For example, the audience size generation circuitry 310 obtains the census event duration V from the census data (e.g., from the census database 104 of FIGS. 1 and 2). In such examples, the audience size generation circuitry 310 substitutes the census event duration V and the actual universe estimate U into the second part of the constraint equation (e.g., the right-hand side of Equation 18) and determines a value of the second part of the constraint equation.

At block 510, the example audience estimate control circuitry 110 solves the constraint equation to determine the census audience size. For example, the audience size generation circuitry 310 solves the constraint equation for the unknown variable X in the second part of the constraint equation. In such examples, a value of the variable X corresponds to the census audience size.

At block 512, the example audience estimate control circuitry 110 generates a report. For example, the report generation circuitry 312 (FIG. 3) generates a report including the census audience size corresponding to the single event. In some examples, additionally or alternatively, the audience estimate database circuitry 308 stores the census audience size and/or the report. The example program 500 ends.

FIG. 6 is a flowchart representative of example machine readable instructions which may be executed to implement the example audience estimate control circuitry 110 of FIGS. 1, 2, and/or 3 to estimate census audience size for multiple events. In the illustrated example of FIG. 6, an example program 600 begins as the network interface circuitry 302 of FIG. 3 accesses panel data from the panel database 102 (FIG. 1) and accesses census data from the census database 104 (FIG. 1). For example, the network interface circuitry 202 may access panel event durations and panel audience sizes from the panel database 102, and census event durations from the census database 104. In some examples, the census event durations, the panel event durations, and/or the panel audience sizes correspond to multiple events (e.g., visiting a website, watching media, etc.).

At block 602, the example audience estimate control circuitry 110 calculates a panel pseudo-universe estimate $Q_P$ based on the panel data. For example, the universe estimate calculation circuitry 304 (FIG. 3) obtains the panel audience sizes $A_j$, the panel event durations $D_j$, and the total panel audience size $A_.$ from the panel data (e.g., from the panel database 102 of FIGS. 1 and 2) via the network interface circuitry 302. In such examples, the universe estimate calculation circuitry 304 substitutes the panel audience sizes $A_j$, the panel event durations $D_j$, and the total panel audience size $A_.$ into Equation 15 above, and solves the equation to determine the panel pseudo-universe estimate $Q_P$.

At block 604, the example audience estimate control circuitry 110 selects constraint equations. For example, the constraint equation control circuitry 306 (FIG. 3) selects Equation 14 above corresponding to each event (e.g., events j={1, 2, . . . n} such as accessing a website, accessing media, etc.). In such examples, the panel audience sizes $A_j$, the panel event durations $D_j$, and the census event durations $V_j$ are known, and the census audience sizes $X_j$ are unknown.

At block 606, the example audience estimate control circuitry 110 substitutes the panel pseudo-universe estimate $Q_P$ and the panel data into a first part of the constraint equations. For example, the audience size generation circuitry 310 (FIG. 3) obtains the panel audience sizes $A_j$ and the panel event durations $D_j$ from the panel data (e.g., from the panel database 102 of FIGS. 1 and 2), and obtains the panel pseudo-universe estimate $Q_P$ calculated by the universe estimate calculation circuitry 302 using Equation 15 above. In such examples, the audience size generation circuitry 310 substitutes the panel audience sizes $A_j$, the panel event durations $D_j$, and the panel pseudo-universe estimate $Q_P$ into the first part of the constraint equations (e.g., the left-hand side of Equation 14) and determines values of the first part of the constraint equations.

At block 608, the example audience estimate control circuitry 110 substitutes the census data into a second part of the constraint equations. For example, the audience size generation circuitry 310 obtains the census event durations $V_j$ from the census data (e.g., from the census database 104 of FIGS. 1 and 2). In such examples, the audience size generation circuitry 310 substitutes the census event durations $V_j$ into the second part of the constraint equations (e.g., the right-hand side of Equation 18). Thus, the constraint equations include the unknown variables $X_j$ corresponding to the census audience sizes and $Q_C$ corresponding to a census pseudo-universe estimate.

At block 610, the example audience estimate control circuitry 110 selects an auxiliary equation corresponding to the census pseudo-universe estimate $Q_C$. For example, the universe estimate calculation circuitry 304 selects Equation 16 and substitutes a known value of the total census audience size $X$, obtained from the census data (e.g., the census database 104 of FIGS. 1 and 2). Similarly, the auxiliary equation includes the unknown variables $X_j$ corresponding to the census audience sizes and $Q_C$ corresponding to the census pseudo-universe estimate.

At block 612, the example audience estimate control circuitry 110 selects a system of equations including the constraint equations and the auxiliary equation. For example, the audience size generation circuitry 310 generates the system of equations (e.g., based on Equation 14) including the constraint equations corresponding to each event (e.g., the events j={1, 2, . . . n}) selected by the constraint equation control circuitry 306 and further including the auxiliary equation (e.g., based on Equation 16) selected by the universe estimate calculation circuitry 304. In such examples, the system of equations includes n+1 equations and n+1 unknown variables, where n is the number of events.

At block 614, the example audience estimate control circuitry 110 solves the system of equations to determine the census audience sizes $X_j$. For example, the audience size generation circuitry 310 solves the system of equations to determine values for each of the unknown variables $X_j$ corresponding to the census audience sizes and $Q_C$ corresponding to the census pseudo-universe estimate. In some examples, the audience size generation circuitry 310 can use any numerical algorithm for solving the system of equations.

At block 616, the example audience estimate control circuitry 110 generates a report. For example, the report generation circuitry 312 (FIG. 3) generates a report including the census audience sizes corresponding to the events and/or the census pseudo-universe estimate. In some examples, additionally or alternatively, the audience estimate database circuitry 308 stores the census audience sizes and/or the census pseudo-universe estimate. The program 600 ends.

Figure 7:
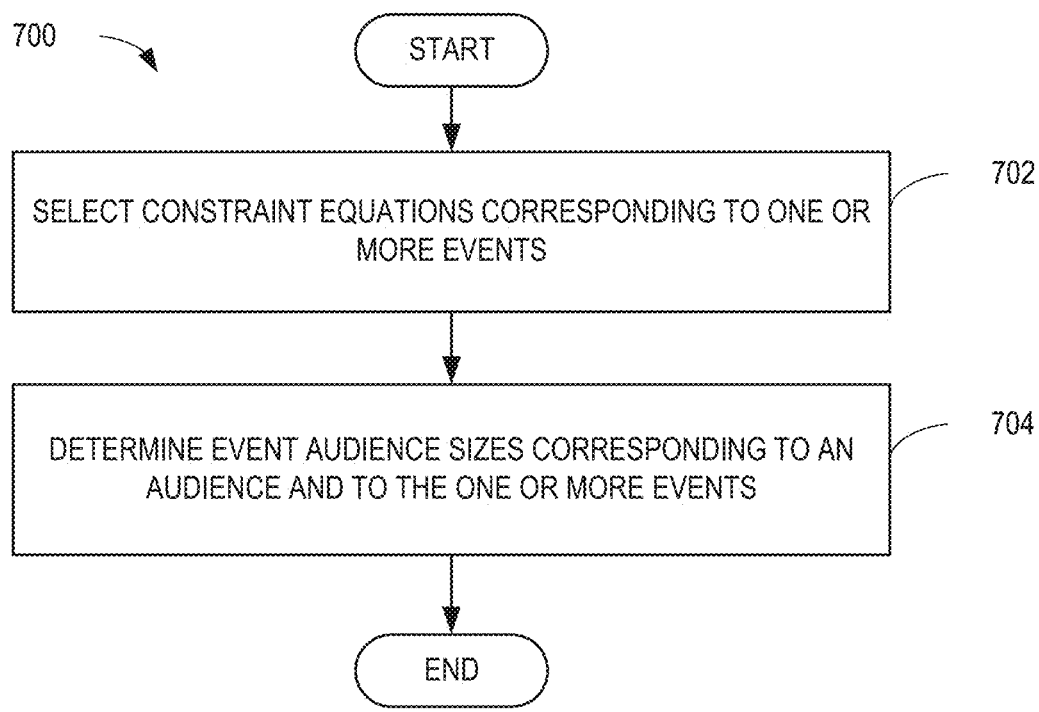
FIG. 7 is a flowchart representative of example machine readable instructions which may be executed to implement the example audience estimate control circuitry of FIGS. 1, 2, and/or 3 to estimate census audience sizes.

FIG. 7 is a flowchart representative of example machine readable instructions which may be executed to implement the example audience estimate control circuitry 110 of FIGS. 1, 2, and/or 3 to estimate census audience sizes. In the illustrated example of FIG. 7, an example program 700 begins as the network interface circuitry 302 of FIG. 3 accesses panel data from the panel database 102 (FIGS. 1 and 2) and accesses census data from the census database 104 (FIGS. 1 and 2).

At block 702, the example audience estimate control circuitry 110 selects constraint equations corresponding to one or more events, the one or more events corresponding to a first audience and a second audience, the first audience to include the second audience. For example, the constraint equation control circuitry 306 (FIG. 3) selects Equation 14 above corresponding to each of the one or more events (e.g., events j={1, 2, . . . n} such as accessing a website, accessing media, etc.). In such examples, the panel audience sizes $A_j$, the panel event durations $D_j$, and the census event durations $V_j$ are known, and the census audience sizes $X_j$ are unknown. In this example, the first audience corresponds to the census audience, and the second audience corresponds to the panel audience.

At block 704, the example audience estimate control circuitry 110 determines, based on the constraint equations and an auxiliary equation, event audience sizes corresponding to the first audience and to the one or more events. For example, the audience size generation circuitry 310 (FIG. 3) solves a system of equations including the constraint equations and the auxiliary equation of Equation 16 to determine values for each of the unknown variables $X_j$ corresponding to the census audience sizes and to the one or more events. The program 700 ends.

Figure 8:
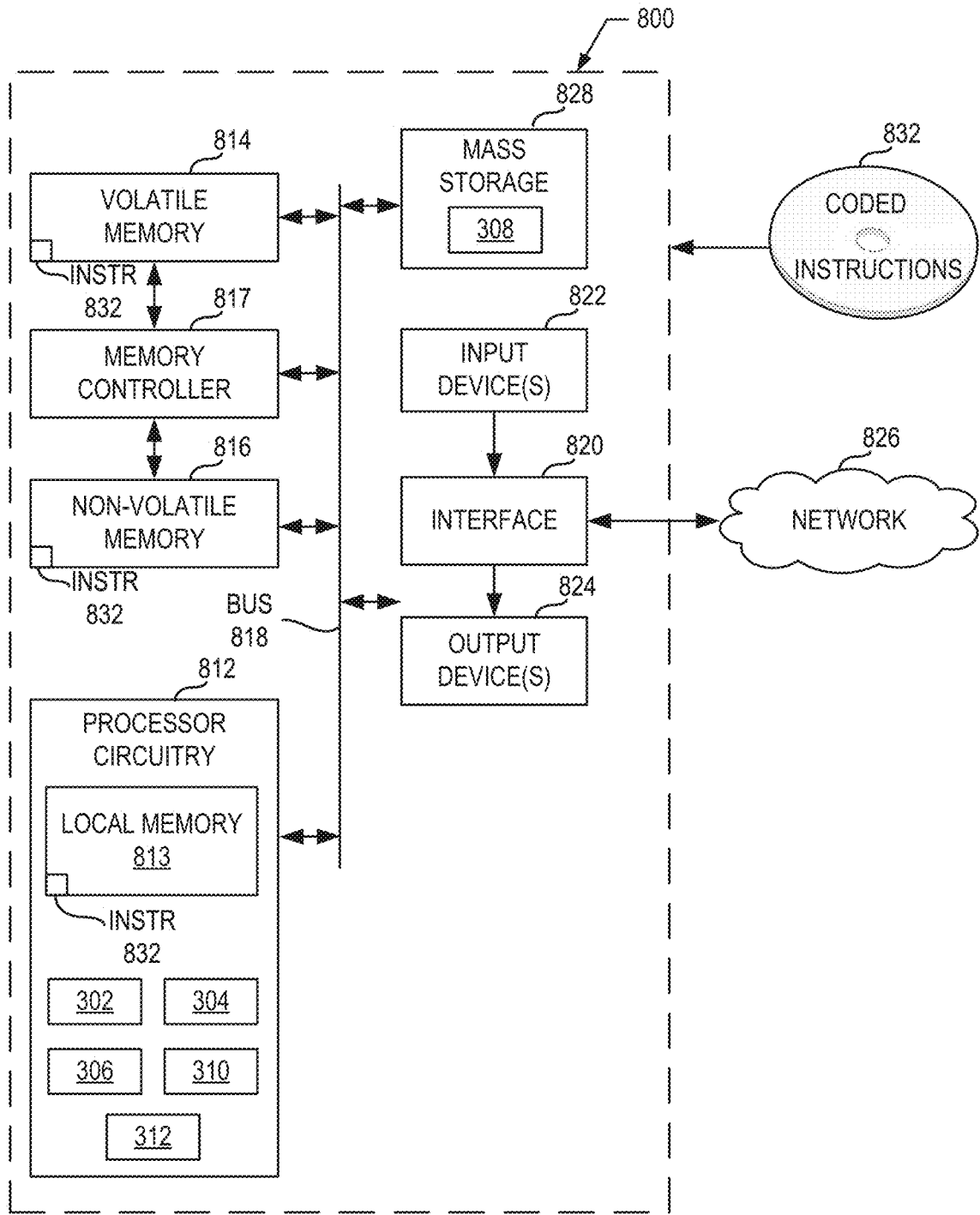
FIG. 8 is a block diagram of an example processing platform structured to execute the instructions of FIGS. 5, 6, and/or 7 to implement the audience estimate control circuitry of FIGS. 1, 2, and/or 3.

FIG. 8 is a block diagram of an example processor platform 800 structured to execute and/or instantiate the machine readable instructions and/or operations of FIGS. 5, 6, and/or 7 to implement the audience estimate control circuitry 110 of FIG. 3. The processor platform 800 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 412 implements the example network interface circuitry 302, the example universe estimate calculation circuitry 304, the example constraint equation control circuitry 306, the example audience size generation circuitry 310, and the example report generation circuitry 312.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface circuitry to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine readable instructions of FIGS. 5, 6, and/or 7, may be stored in the mass storage device 828, in the volatile memory 814, in the non-volatile memory 816, and/or on a removable non-transitory computer readable storage medium such as a CD or DVD.

Figure 9:
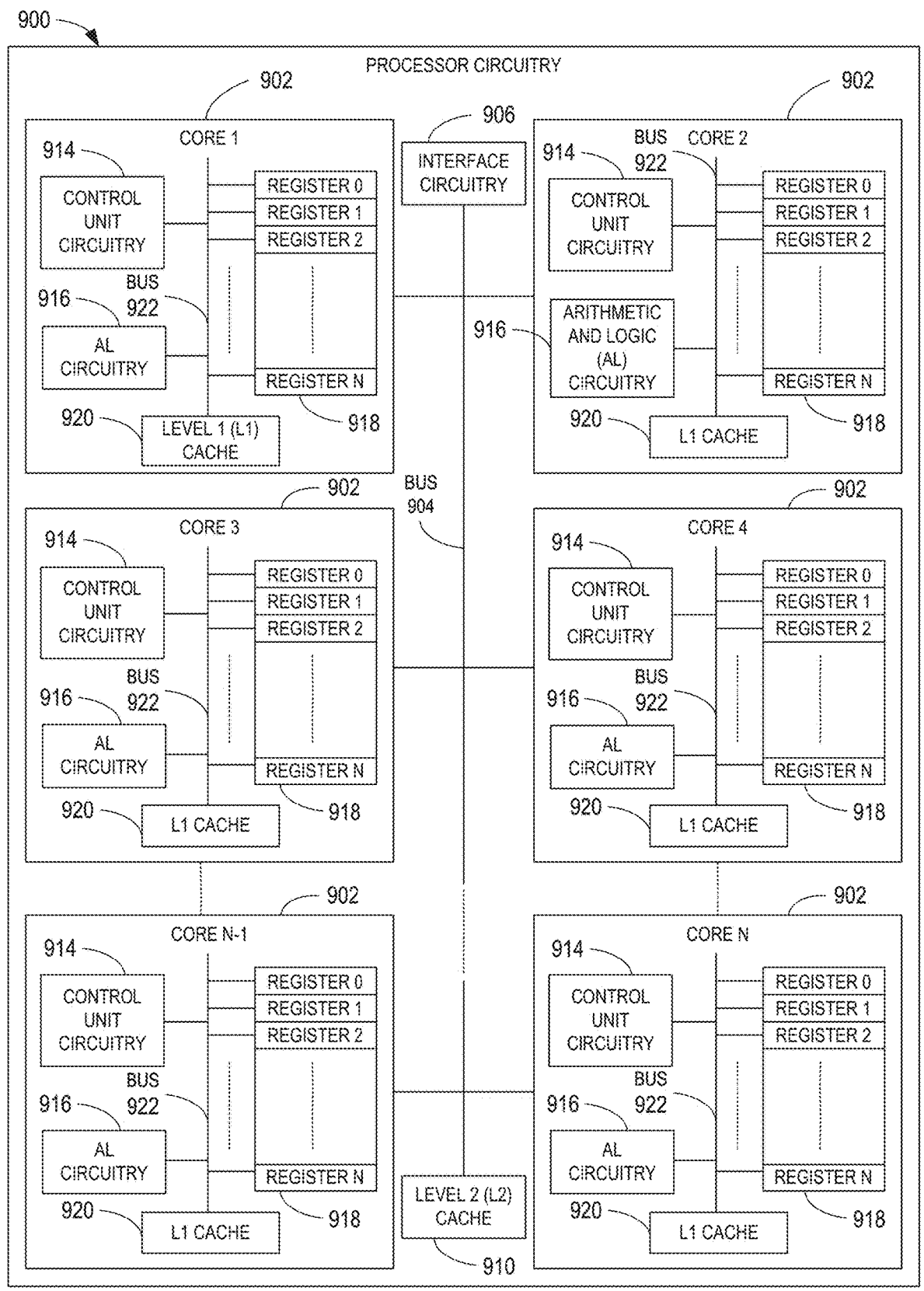

FIG. 9 is a block diagram of an example implementation of the processor circuitry 812 of FIG. 8. In this example, the processor circuitry 812 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 5, 6, and/or 7.

The cores 902 may communicate by an example bus 904. In some examples, the bus 904 may implement a communication bus to effectuate communication associated with one(s) of the cores 902. For example, the bus 904 may implement at least one of an Inter-Integrated Circuit (I2C) bus, a Serial Peripheral Interface (SPI) bus, a PCI bus, or a PCIe bus. Additionally or alternatively, the bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The bus 920 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
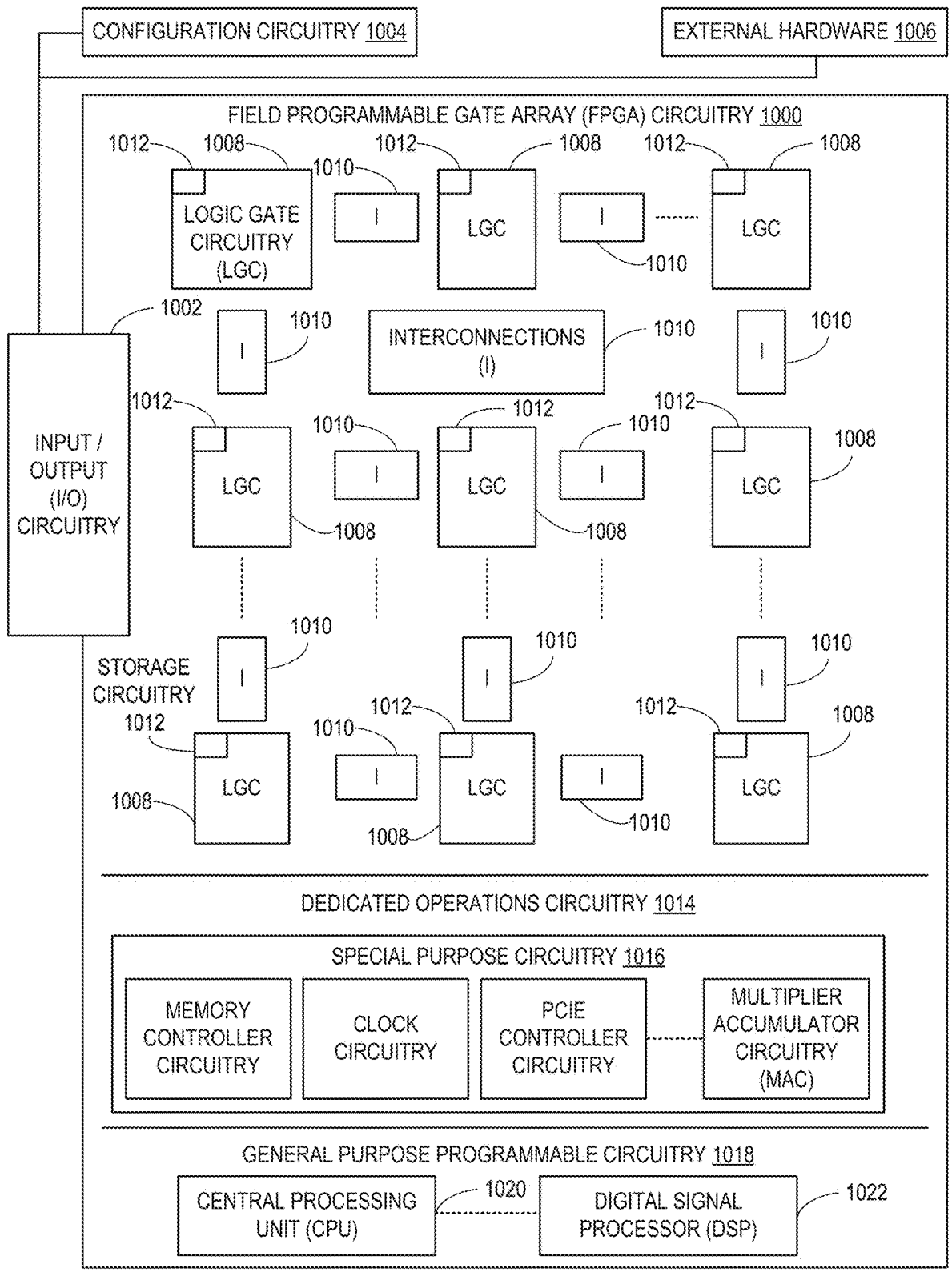

FIG. 10 is a block diagram of another example implementation of the processor circuitry 812 of FIG. 8. In this example, the processor circuitry 812 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowchart of FIGS. 5, 6, and/or 7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 5, 6, and/or 7. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 5, 6, and/or 7. As such, the FPGA circuitry 1000 may be structured to effectively instantiate some or all of the machine readable instructions of the flowcharts of FIGS. 5, 6, and/or 7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 5, 6, and/or 7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 5, 6, and/or 7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an onboard CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 5, 6, and/or 7 may be executed by one or more of the cores 902 of FIG. 9 and a second portion of the machine readable instructions represented by the flowcharts of FIGS. 5, 6, and/or 7 may be executed by the FPGA circuitry 1000 of FIG. 10.

In some examples, the processor circuitry 812 of FIG. 8 may be in one or more packages. For example, the processor circuitry 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

From the foregoing, it will be appreciated that example methods, apparatus and articles of manufacture have been disclosed that estimate audience sizes and durations. The disclosed methods, apparatus and articles of manufacture improve the efficiency of using a computing device by estimating census audience sizes for one or more events based on panel audience sizes and panel durations for the one or more events, thus enabling accurate estimation of the census audience sizes when census-level data is limited. In some examples, the disclosed methods, apparatus and articles of manufacture substantially reduce processing time by determining census audience size estimates using a predetermined set of equations that enable estimation across multiple dimensions, thus reducing a number of equations required for each of the multiple dimensions. The disclosed methods, apparatus and articles of manufacture are accordingly directed to one or more improvement(s) in the functioning of a computer.

Example 1 includes an apparatus including at least one memory, instructions, and processor circuitry to execute the instructions to select constraint equations corresponding to one or more events, the one or more events corresponding to a first audience and a second audience, the first audience to include the second audience, and determine, based on the constraint equations and an auxiliary equation, event audience sizes corresponding to the first audience and to the one or more events.

Example 2 includes the apparatus of Example 1, where the event audience sizes are first event audience sizes, the processor circuitry to execute the instructions to determine the first event audience sizes based on first duration values, second event audience sizes, and second duration values, the first duration values corresponding to the first audience and to the one or more events, the second event audience sizes and second duration values corresponding to the second audience and to the one or more events.

Example 3 includes the apparatus of Example 2, where the processor circuitry is to execute the instructions to select the auxiliary equation based on the first duration values, the auxiliary equation corresponding to a first universe estimate.

Example 4 includes the apparatus of Example 3, where the processor circuitry is to execute the instructions to determine a second universe estimate based on at least one of the second event audience sizes or the second duration values.

Example 5 includes the apparatus of Example 4, where the processor circuitry is to execute the instructions to determine the first universe estimate based on the second universe estimate, the constraint equations, and the auxiliary equation.

Example 6 includes the apparatus of Example 1, where the processor circuitry is to execute the instructions to generate a report including the event audience sizes.

Example 7 includes the apparatus of Example 1, where the one or more events include at least one of accessing a website, accessing an advertisement, or using a device type.

Example 8 includes an apparatus including constraint equation control circuitry to select constraint equations corresponding to one or more events, the one or more events corresponding to a first audience and a second audience, the first audience to include the second audience, and audience size generation circuitry to determine, based on the constraint equations and an auxiliary equation, event audience sizes corresponding to the first audience and to the one or more events.

Example 9 includes the apparatus of Example 8, where the event audience sizes are first event audience sizes, the audience size generation circuitry to determine the first event audience sizes based on first duration values, second event audience sizes, and second duration values, the first duration values corresponding to the first audience and to the one or more events, and the second event audience sizes and second duration values corresponding to the second audience and to the one or more events.

Example 10 includes the apparatus of Example 9, further including universe estimate calculation circuitry to select the auxiliary equation based on the first duration values, the auxiliary equation corresponding to a first universe estimate.

Example 11 includes the apparatus of Example 10, where the universe estimate calculation circuitry is to determine a second universe estimate based on at least one of the second event audience sizes or the second duration values.

Example 12 includes the apparatus of Example 11, where the audience size generation circuitry determines the first universe estimate based on the second universe estimate, the constraint equations, and the auxiliary equation.

Example 13 includes the apparatus of Example 8, further including report generation circuitry to generate a report including the event audience sizes.

Example 14 includes the apparatus of Example 8, where the one or more events include at least one of accessing a website, accessing an advertisement, or using a device type.

Example 15 includes a non-transitory computer readable medium including instructions which, when executed, cause a processor to at least select constraint equations corresponding to one or more events, the one or more events corresponding to a first audience and a second audience, the first audience to include the second audience, and determine, based on the constraint equations and an auxiliary equation, event audience sizes corresponding to the first audience and to the one or more events.

Example 16 includes the non-transitory computer readable medium of Example 15, where the event audience sizes are first event audience sizes, and the instructions, when executed, cause the processor to determine the first event audience sizes based on first duration values, second event audience sizes, and second duration values, the first duration values corresponding to the first audience and to the one or more events, and the second event audience sizes and second duration values corresponding to the second audience and to the one or more events.

Example 17 includes the non-transitory computer readable medium of Example 16, where the instructions, when executed, cause the processor to select the auxiliary equation based on the first duration values, the auxiliary equation corresponding to a first universe estimate.

Example 18 includes the non-transitory computer readable medium of Example 17, where the instructions, when executed, cause the processor to determine a second universe estimate based on at least one of the second event audience sizes or the second duration values.

Example 19 includes the non-transitory computer readable medium of Example 18, where the instructions, when executed, cause the processor to determine the first universe estimate based on the second universe estimate, the constraint equations, and the auxiliary equation.

Example 20 includes the non-transitory computer readable medium of Example 15, where the instructions, when executed, further cause the processor to generate a report including the event audience sizes.

Example 21 includes the non-transitory computer readable medium of Example 15, where the one or more events include at least one of accessing a website, accessing an advertisement, or using a device type.

Example 22 includes a method including selecting constraint equations corresponding to one or more events, the one or more events corresponding to a first audience and a second audience, the first audience to include the second audience, and determining, based on the constraint equations and an auxiliary equation, event audience sizes corresponding to the first audience and to the one or more events.

Example 23 includes the method of Example 22, where the event audience sizes are first event audience sizes, and further includes determining the first event audience sizes based on first duration values, second event audience sizes, and second duration values, the first duration values corresponding to the first audience and to the one or more events, and the second event audience sizes and second duration values corresponding to the second audience and to the one or more events.

Example 24 includes the method of Example 23, and further includes selecting the auxiliary equation based on the first duration values, the auxiliary equation corresponding to a first universe estimate.

Example 25 includes the method of Example 24, and further includes determining a second universe estimate based on at least one of the second event audience sizes or the second duration values.

Example 26 includes the method of Example 25, and further includes determining the first universe estimate based on the second universe estimate, the constraint equations, and the auxiliary equation.

Example 27 includes the method of Example 22, and further includes generating a report including the event audience sizes.

Example 28 includes the method of Example 22, where the one or more events include at least one of accessing a website, accessing an advertisement, or using a device type.

Example 29 includes an apparatus including means for selecting constraint equations corresponding to one or more events, the one or more events corresponding to a first audience and a second audience, the first audience to include the second audience, and means for determining event audience sizes based on the constraint equations and an auxiliary equation, the event audience sizes corresponding to the first audience and to the one or more events.

Example 30 includes the apparatus of Example 29, where the means for determining the event audience sizes is to determine the event audience sizes based on first duration values, second event audience sizes, and second duration values, the first duration values corresponding to the first audience and to the one or more events, and the second event audience sizes and second duration values corresponding to the second audience and to the one or more events.

Example 31 includes the apparatus of Example 30, and further includes means for selecting the auxiliary equation based on the first duration values, the auxiliary equation corresponding to a first universe estimate.

Example 32 includes the apparatus of Example 31, where the means for selecting the auxiliary equation is to determine a second universe estimate based on at least one of the second event audience sizes or the second duration values.

Example 33 includes the apparatus of Example 32, where the means for determining the event audience sizes is to determine the first universe estimate based on the second universe estimate, the constraint equations, and the auxiliary equation.

Example 34 includes the apparatus of Example 29, and further includes means for generating a report, the report to include the event audience sizes.

Example 35 includes the apparatus of Example 29, where the one or more events include at least one of accessing a website, accessing an advertisement, or using a device type.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:
1. An audience measurement system comprising:
a plurality of panel meters located at panelist households, the plurality of panel meters configured to transmit monitoring data representative of media to which panelists were exposed to an audience measurement entity for storage in a panel database, wherein the plurality of panel meters comprise on-device meter systems that locally collect web browsing information;
an impression collection server configured to receive census impressions from a plurality of non-panelist devices and store impression-related data indicative of the census impressions in a census database, wherein execution of beacon instructions by web browsers of the non-panelist devices causes the non-panelist devices to send impression requests to the impression collection server via the internet and to provide device identifiers and media identifiers in the impression requests, wherein the media identifiers enable the audience measurement system to identify media accessed via the non-panelist devices, wherein the impression requests are implemented as hypertext transfer protocol (HTTP) requests;
a computing system comprising a processor and a memory, the computing system configured to:
obtain panelist data corresponding to a panel audience from the panel database, the panelist data including: (i) a first panel audience size and a first panel event duration for a first website and (ii) a second panel audience size and a second panel event duration for a second website;
obtain census data corresponding to a census audience from the census database, the census data including a first census event duration for the first website, a second census event duration for the second website, and a total census audience size for the first website and the second website;
determine a first census audience size for the first website and a second census audience size for the second website by:
selecting constraint equations from the memory, the constraint equations corresponding to one or more events, the one or more events corresponding to the first website and the second website; and
selecting an auxiliary equation from the memory, the auxiliary equation including (a) the total census audience size, (b) a first universe estimate corre- sponding to the census audience size, and (c) the first census audience size and the second census audience size;

cause storage of the first audience size and the second audience size in a database after determining the first census audience size and the second census audience size based on the constraint equations and the auxiliary equation; and generate a report including the first audience size and the second audience size.

2. The audience measurement system of claim 1, wherein the computing system is configured to determine the first census audience size and the second census audience size based on the first census event duration, the second census event duration, the first panel audience size, the second panel audience size, the first panel event duration, and the second panel event duration.

3. The audience measurement system of claim 2, wherein the computing system is configured to select the auxiliary equation based on the first census event duration and the second census event duration.

4. The audience measurement system of claim 3, wherein the computing system is configured to determine a second universe estimate based on at least one of the first panel audience size, the second panel audience size, the first panel event duration, or the second panel event duration.

5. The audience measurement system of claim 4, wherein the computing system is configured to determine the first universe estimate based on the second universe estimate, the constraint equations, and the auxiliary equation.

6. The audience measurement system of claim 1, wherein the one or more events include at least one of accessing at least one the first website or the second website, accessing an advertisement presented by at least one of the first website or the second website, or using a device type to access the at least one of the first website or the second website.

7. A method comprising:

storing, in a panel database of an audience measurement system, monitoring data representative of media to which panelists were exposed to, the monitoring data received from a plurality of panel meters located at panelist households, the plurality of panel meters comprising on-device meter systems that locally collect web browsing information;

receiving, by an impression collection server of the audience measurement system, census impressions from a plurality of non-panelist devices;

storing, by the impression collection server, impression-related data indicative of the census impressions in a census database, wherein execution of beacon instructions by web browsers of the non-panelist devices causes the non-panelist devices to send impression requests to the impression collection server via the internet and to provide device identifiers and media identifiers in the impression requests, wherein the media identifiers enable the audience measurement system to identify media accessed via the non-panelist devices, wherein the impression requests are implemented as hypertext transfer protocol (HTTP) requests;

obtaining, by a computing system of the audience measurement system, panelist data corresponding to a panel audience from the panel database, the panelist data including: (i) a first panel audience size and a first panel event duration for a first website and (ii) a second panel audience size and a second panel event duration for a second website, the first panel audience size and the second panel audience size obtained using panel meters;

obtaining, by the computing system, census data corresponding to a census audience from the census database, the census data including a first census event duration for the first website, a second census event duration for the second website, and a total census audience size for the first website and the second website;

determining, by the computing system, a first census audience size for the first website and a second census audience size for the second website by:

selecting constraint equations from a memory, the constraint equations corresponding to one or more events, the one or more events corresponding to the first website and the second website; and selecting by an auxiliary equation from the memory, the auxiliary equation including (a) the total census audience size, (b) a first universe estimate corresponding to the census audience size, and (c) the first census audience size and the second census audience size;

causing, by the computing system, storage of the first audience size and the second audience size in a database after determining the first census audience size and the second census audience size based on the constraint equations and the auxiliary equation; and generating a report including the first audience size and the second audience size.

8. The method of claim 7, wherein the first census audience size is determined based on the first census event duration, the second census event duration, the first panel audience size, the second panel audience size, the first panel event duration, and the second panel event duration.

9. The method of claim 8, wherein the auxiliary equation is selected based on the first census event duration and the second census event duration.

10. The method of claim 9, further comprising determining a second universe estimate based on at least one of the first panel audience size, the second panel audience size, the first panel event duration, or the second panel event duration.

11. The method of claim 10, wherein the first universe estimate is determined based on the second universe estimate, the constraint equations, and the auxiliary equations.

12. The method of claim 7, wherein the one or more events include at least one of accessing at least one of the first website or the second website, accessing an advertisement presented by at least one of the first website or the second website, or using a device type to access the at least one of the first website or the second website.

13. A non-transitory computer readable medium comprising instructions that when executed by a computing system cause the computing system to:

store, in a panel database of an audience measurement system, monitoring data representative of media to which panelists were exposed to, the monitoring data received from a plurality of panel meters located at panelist households, the plurality of panel meters comprising on-device meter systems that locally collect web browsing information;

receive, by an impression collection server of the audience measurement system, census impressions from a plurality of non-panelist devices;

store, by the impression collection server, impression-related data indicative of the census impressions in a census database, wherein execution of beacon instructions by web browsers of the non-panelist devices causes the non-panelist devices to send impression requests to the impression collection server via the internet and to provide device identifiers and media identifiers in the impression requests, wherein the media identifiers enable the audience measurement system to identify media accessed via the non-panelist devices, wherein the impression requests are implemented as hypertext transfer protocol (HTTP) requests;

obtain panelist data corresponding to a panel audience from the panel database, the panelist data including: (i) a first panel audience size and a first panel event duration for a first website and (ii) a second panel audience size and a second panel event duration for a second website;

obtain census data corresponding to a census audience from the census database, the census data including a first census event duration for the first website, a second census event duration for the second website, and a total census audience size for the first website and the second website;

determine a first census audience size for the first website and a second census audience size for the second website by:
  selecting constraint equations from computer memory, the constraint equations corresponding to one or more events, the one or more events corresponding to the first website and the second website; and
  selecting an auxiliary equation from the computer memory, the auxiliary equation including (a) the total census audience size, (b) a first universe estimate corresponding to the census audience size, and (c) the first census audience size and the second census audience size;

cause storage of the first audience size and the second audience size in a database after determining the first census audience size and the second census audience size based on the constraint equations and the auxiliary equation; and generate a report including the first audience size and the second audience size.

14. The non-transitory computer readable medium of claim 13, wherein the instructions cause the computing system to determine the first census audience size and the second census audience size based on the first census event duration, the second census event duration, the first panel audience size, the second panel audience size, the first panel event duration, and the second panel event duration.

15. The non-transitory computer readable medium of claim 14, wherein the instructions cause the computing system to select the auxiliary equation based on the first census event duration and the second census event duration.

16. The non-transitory computer readable medium of claim 15, wherein the instructions cause the computing system to determine a second universe estimate based on at least one of the first panel audience size, the second panel audience size, the first panel event duration, or the second panel event duration.

17. The non-transitory computer readable medium of claim 16, wherein the instructions cause the computing system to determine the first universe estimate based on the second universe estimate, the constraint equations, and the auxiliary equation.

18. The non-transitory computer readable medium of claim 13, wherein the one or more events include at last one of accessing at least one of the first website or the second website, accessing an advertisement presented by at least one of the first website or the second website, or using a device type to access the at least one of the first website or the second website.

* * * * *